US012622352B2

(12) United States Patent
Dietsche et al.

(10) Patent No.: US 12,622,352 B2
(45) Date of Patent: May 12, 2026

(54) STUBBLE STOMPER WITH SELF-RESETTING BREAKAWAY FEATURE

(71) Applicant: MACDON INDUSTRIES LTD., Winnipeg (CA)

(72) Inventors: Scott Dietsche, Colfax, WI (US); Cyrus Nigon, Deforest, WI (US); Reid Christ, Evansville, WI (US)

(73) Assignee: MACDON INDUSTRIES LTD., Winnipeg (CA)

( * ) Notice: Subject to any disclaimer, the term of this patent is extended or adjusted under 35 U.S.C. 154(b) by 384 days.

(21) Appl. No.: 18/240,383

(22) Filed: Aug. 31, 2023

(65) Prior Publication Data

US 2024/0065149 A1 Feb. 29, 2024

Related U.S. Application Data

(60) Provisional application No. 63/402,645, filed on Aug. 31, 2022.

(51) Int. Cl.
*A01D 34/835* (2006.01)

(52) U.S. Cl.
CPC ................................. *A01D 34/8355* (2013.01)

(58) Field of Classification Search
CPC ...... A01D 34/00–34/905; A01D 41/00–41/16; A01D 34/8355
See application file for complete search history.

(56) References Cited

U.S. PATENT DOCUMENTS

| | | | | | |
|---|---|---|---|---|---|
| 9,743,587 | B2 * | 8/2017 | Lohrentz | ................ | A01D 75/18 |
| 10,945,371 | B2 * | 3/2021 | Lauff | .................... | A01D 65/08 |
| 11,039,572 | B1 * | 6/2021 | Buetow | .................. | A01D 41/14 |
| 11,647,693 | B2 * | 5/2023 | Shane | .................... | A01D 47/00 |
| | | | | | 56/504 |
| 11,925,138 | B2 * | 3/2024 | Florence | ................ | A01D 33/14 |
| 2013/0019581 | A1 * | 1/2013 | Hyronimus | ............ | A01D 63/00 |
| | | | | | 56/314 |
| 2013/0192857 | A1 * | 8/2013 | Shoup | .................. | A01D 75/187 |
| | | | | | 29/891 |
| 2014/0131973 | A1 * | 5/2014 | Benoit | ............... | A01D 34/8355 |
| | | | | | 280/160 |
| 2015/0096773 | A1 * | 4/2015 | Miller | ................ | A01D 34/8355 |
| | | | | | 172/540 |
| 2015/0250098 | A1 * | 9/2015 | Vandeven | .......... | A01D 34/8355 |
| | | | | | 56/52 |
| 2016/0066504 | A1 * | 3/2016 | Holman | ............. | A01D 34/8355 |
| | | | | | 56/504 |
| 2016/0183468 | A1 * | 6/2016 | Lohrentz | .............. | A01D 45/021 |
| | | | | | 56/51 |
| 2018/0325027 | A1 * | 11/2018 | Lohrentz | ............ | A01D 34/8355 |

* cited by examiner

*Primary Examiner* — Joseph M Rocca
*Assistant Examiner* — Madeline I Runco
(74) *Attorney, Agent, or Firm* — Miller Canfield

(57) ABSTRACT

A stubble stomper is disclosed that attaches to a crop harvesting header on an agricultural machine. The stubble stomper includes a mounting bracket that attaches to the header frame of the crop harvesting header, a hinge assembly that is rotatably attached to the stomper mounting bracket and is rotatable between a default position and a breakaway position, and a stomper shoe that is pivotally attached to the hinge assembly. The stubble stomper has a self-resetting feature from the breakaway position that allows the stubble stomper to re-engage to its default position as the agricultural machine moves in a forward direction of travel.

15 Claims, 26 Drawing Sheets

STUBBLE STOMPER WITH SELF-RESETTING BREAKAWAY FEATURE

CROSS-REFERENCE TO RELATED APPLICATIONS

This application claims priority to and all the benefits of U.S. Provisional Patent Application No. 63/402,645, filed Aug. 31, 2022, and is entitled "Stubble Stomper with Self-Resetting Breakaway Feature", the disclosure of which is hereby incorporated by reference in its entirety.

BACKGROUND OF THE INVENTION

1. Field of the Invention

The present invention relates to a stubble stomper for use with a crop harvesting header on an agricultural machine, and more particularly, to a stubble stomper that has a self-resetting breakaway feature.

2. Description of Related Art

Stubble stompers for crushing and bending the remaining base of harvested crop stalks are known in the art. After a crop is harvested, such as corn or sunflowers, the base of the stalks remains below where the crop was cut during harvesting. These short remaining stalks can be disruptive and problematic for farm equipment, particularly the tires. In some cases, the stalks are rigid and can be sharp. Therefore, stubble stompers are attached to an agricultural machine, such as a corn harvester, and pulled along with the agricultural machine to engage with the remaining stalks as the agricultural machine moves across the field resulting in bent and/or crushed stalks. Bent and crushed stalk bases are also desirable to help promote decomposition of the stalk bases.

There are different known designs for stubble stompers, which are also referred to as stalk crushers. However, there are several problems with current designs of stubble stompers due to their inability to flex or pivot. The following paragraphs list several known problems with current known designs of stubble stompers but is not intended to be an exhaustive or all-inclusive list.

One problem arises when the stubble stomper is being loaded onto or off a trailer. Since the shoes on the stompers are rigidly attached to their frame and ultimately an agricultural machine, they can loosen, bend, jam, and/or partially or completely break off during the loading and/or unloading process, for example if it catches on something.

A second problem is when farming equipment encounters larger objects or obstructions, such as rocks. They can either break or loosen from the agricultural machine.

A third problem with known stubble stompers is when they are attached to an agricultural machine and the agricultural machine needs to travel in a reverse direction, the stubble stompers can jam or become lodged in the ground. Current designs often require that the stubble stompers be manually removed or be fully raised off the ground from the agricultural machine prior to driving in a reverse direction. Further, current designs require the stompers to be reinstalled again prior to each operation.

Therefore, there is a need for a stubble stomper that: 1) can be loaded and unloaded without bending, loosening, jamming, or breaking; 2) will easily adapt and adjust when it encounters large objects, such as rocks; 3) allows the farming equipment to move in a reverse direction; 4) will not break if not fully raised off the ground; and 5) is self-resetting.

SUMMARY OF THE INVENTION

The current invention satisfies these needs by configuring the stubble stomper with a self-resetting breakaway feature. The stubble stomper includes a stomper mounting bracket adapted for mounting the stubble stomper to a crop harvesting header on an agricultural machine, a hinge assembly rotatably attached to the stomper mounting bracket and rotatable between a default position and a breakaway position, and a stomper shoe pivotally attached to the hinge assembly for engaging crop stubble as the agricultural machine travels across a field.

According to another aspect of the invention, a crop harvesting header comprises a header frame, a cutterbar attached to the header fame, and a stubble stomper attached to the header frame. The stubble stomper comprises a stomper mounting bracket mounted to the header frame, a hinge assembly rotatably attached to the stomper mounting bracket and rotatable between a default position and a breakaway position, and a stomper shoe pivotally attached to the hinge assembly for engaging crop stubble as the crop harvesting header travels across a field.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
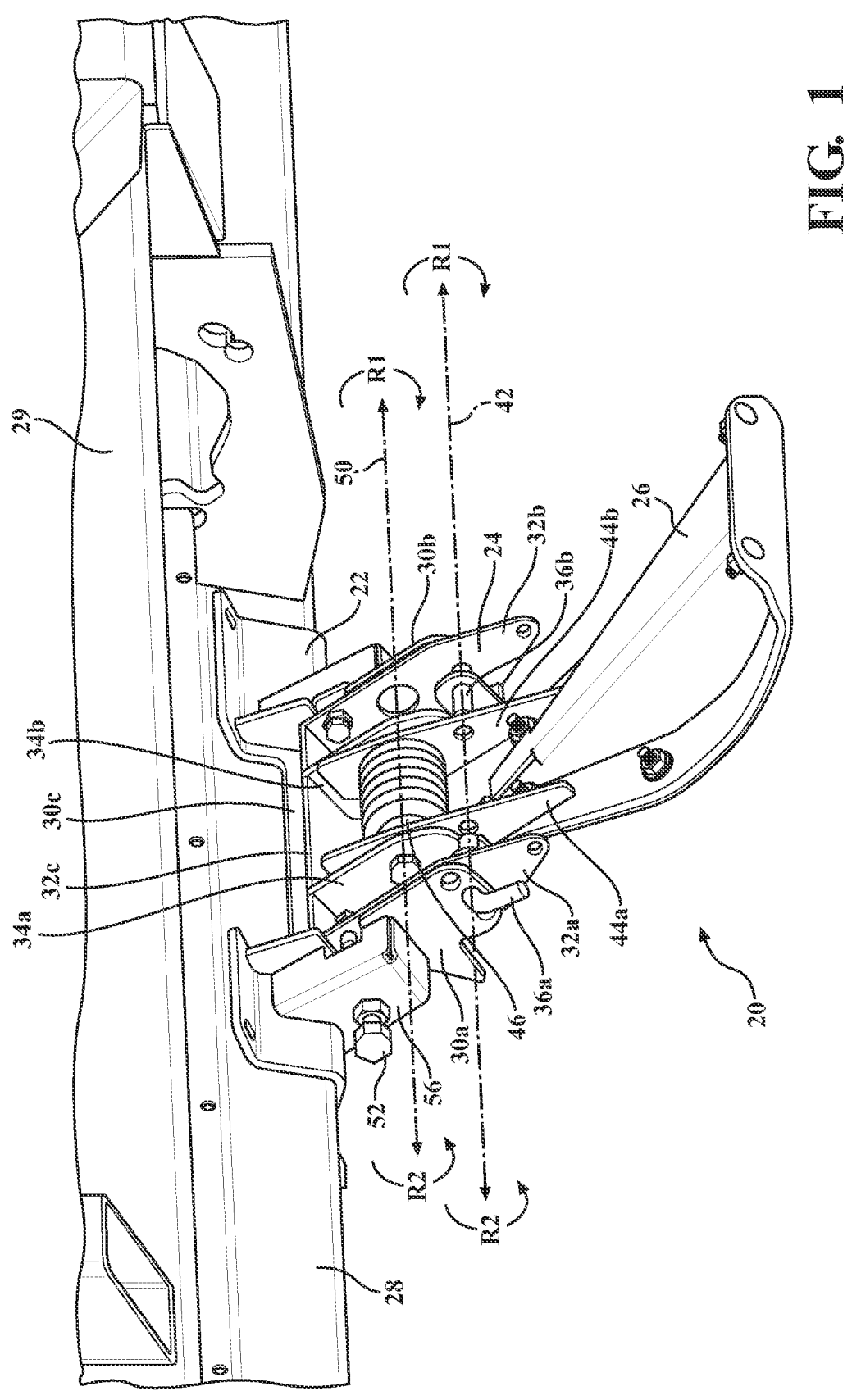
FIG. 1 is a perspective view of a stubble stomper with self-resetting breakaway feature according to a primary embodiment of the present invention in a normal operating position.
Figure 2:
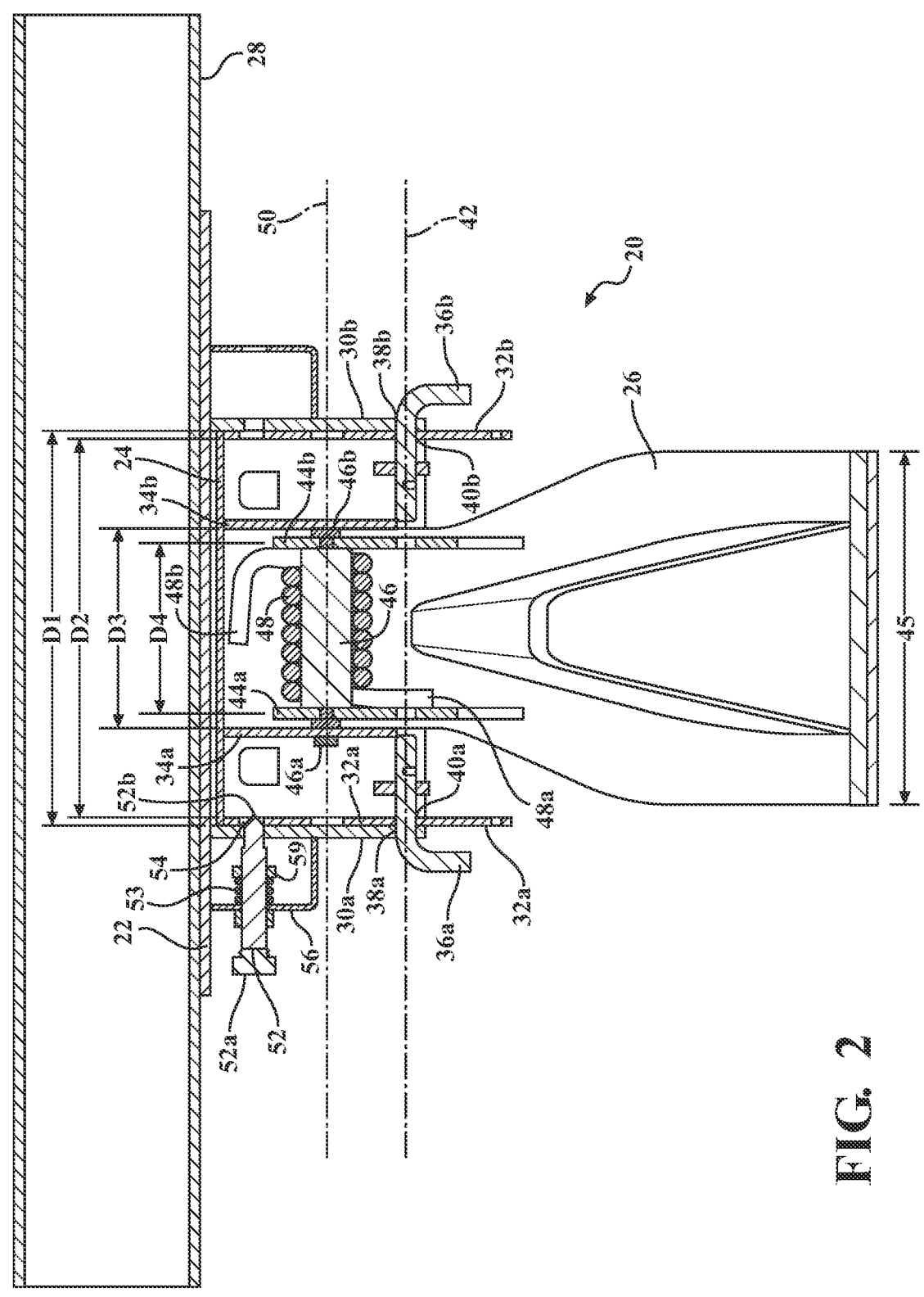
FIG. 2 is a rear cross-sectional view of the stubble stomper shown in FIG. 1.
Figure 3:
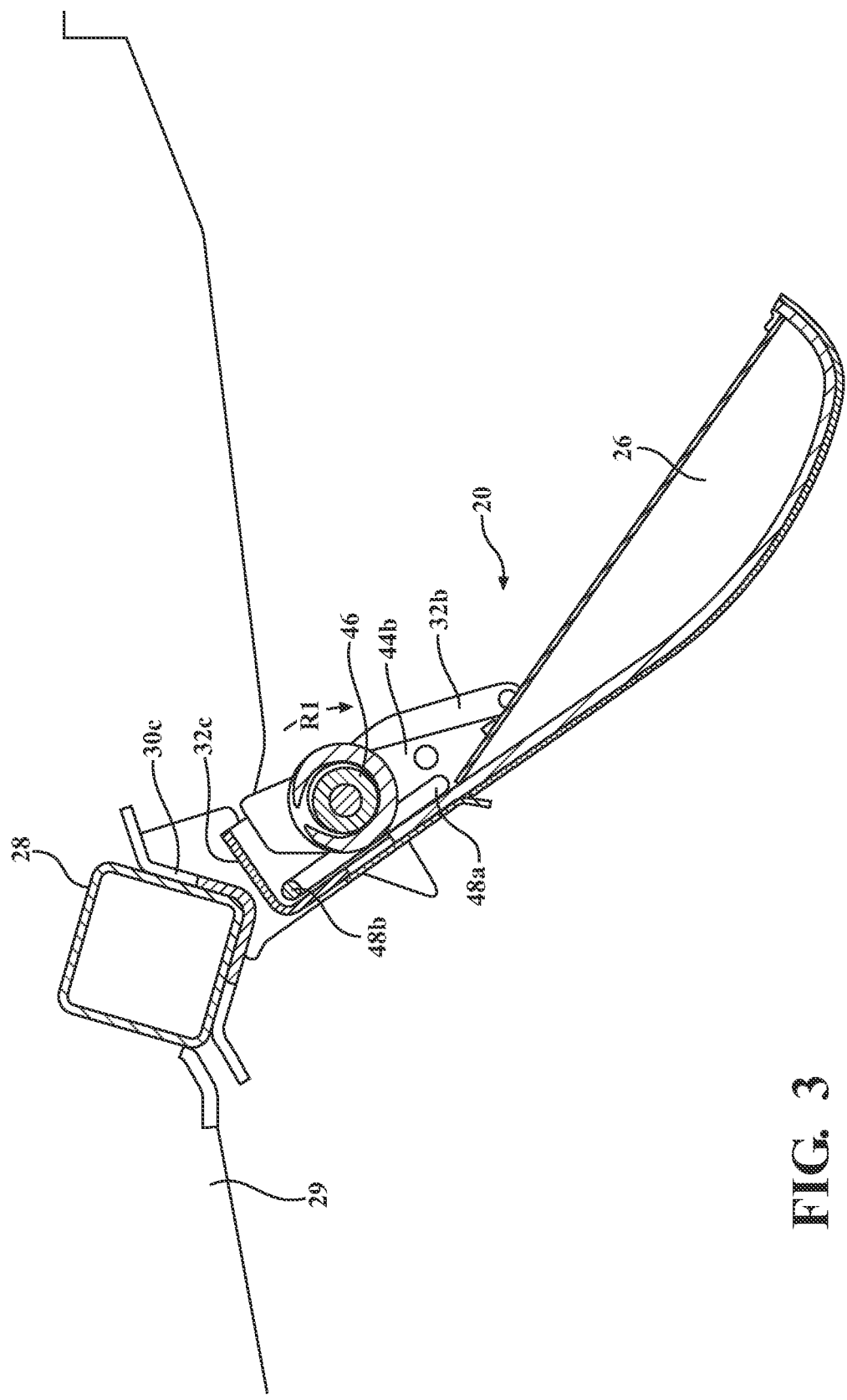
FIG. 3 is a side view of the stubble stomper shown in FIG. 1.

Referring to the Figures, wherein like numerals indicate like or corresponding parts throughout the several views, a stubble stomper with self-resetting breakaway feature is shown generally at 20. Referring to FIGS. 1-3, the stubble stomper 20 includes a stomper mounting bracket 22, a hinge assembly 24 rotatably attached to the stomper mounting bracket 22 and rotatable between a default position and a breakaway position, and a stomper shoe 26 pivotally attached to the hinge assembly 24.

The stomper mounting bracket 22 attaches to the main frame 28 of a crop harvesting header 29 on an agricultural machine, for example a corn header, in a conventional manner. In the illustrated embodiment, the mounting bracket 22 is bolted onto a header frame 28 of the crop harvesting header 29. The mounting bracket 22 includes two protruding parallel walls 30a, 30b that are spaced apart by a first distance D1. A mounting bracket third wall 30c extends between the two parallel walls 30a, 30b and mounts abutted adjacent to the header frame 28 of the crop harvesting header 29.

The hinge assembly 24 includes two sets of protruding parallel walls, an outer set 32a, 32b and an inner set 34a, 34b. The outer set of parallel walls 32a, 32b are spaced apart by a second distance D2. The second distance D2 is less than the first distance D1 between the two parallel walls 30a, 30b of the mounting bracket 22. As a result, the outer parallel walls 32a, 32b of the hinge assembly 24 fit within the parallel walls 30a, 30b of the mounting bracket 22.

The hinge assembly 24 is rotatably attached to the stomper mounting bracket 22 by a pair of pins 36a, 36b. The first parallel wall 30a of the mounting bracket 22 and the first outer parallel wall 32a of the hinge assembly 24 each have a first pivot pin aperture 38a, 40a for receiving the first pivot pin 36a. Similarly, the second parallel wall 30b of the mounting bracket 22 and the second outer parallel wall 32b of the hinge assembly 24 each have a second pivot pin aperture 38b, 40b for receiving the second pivot pin 36b, as shown in FIG. 2. The alignment of the pivot pins 36a, 36b through all four apertures 38a, 38b, 40a, 40b define a hinge assembly rotational axis 42 about which the hinge assembly 24 rotates relative to the mounting bracket 22 when moving from a default, or non-breakaway position to a breakaway position.

The inner set of parallel walls 34a, 34b of the hinge assembly 24 are spaced apart by a third distance D3. The third distance D3 is less than the second distance D2 between the outer parallel walls 32a, 32b of the hinge assembly 24.

The stomper shoe 26 also includes a pair of protruding parallel walls 44a, 44b. The parallel walls 44a, 44b are spaced apart by a fourth distance, D4, that is less than the hinge assembly inner parallel walls third distance, D3. As a result, the parallel walls 44a, 44b of the stomper shoe 26 fit within the inner parallel walls 34a, 34b of the hinge assembly 24.

Figure 4:
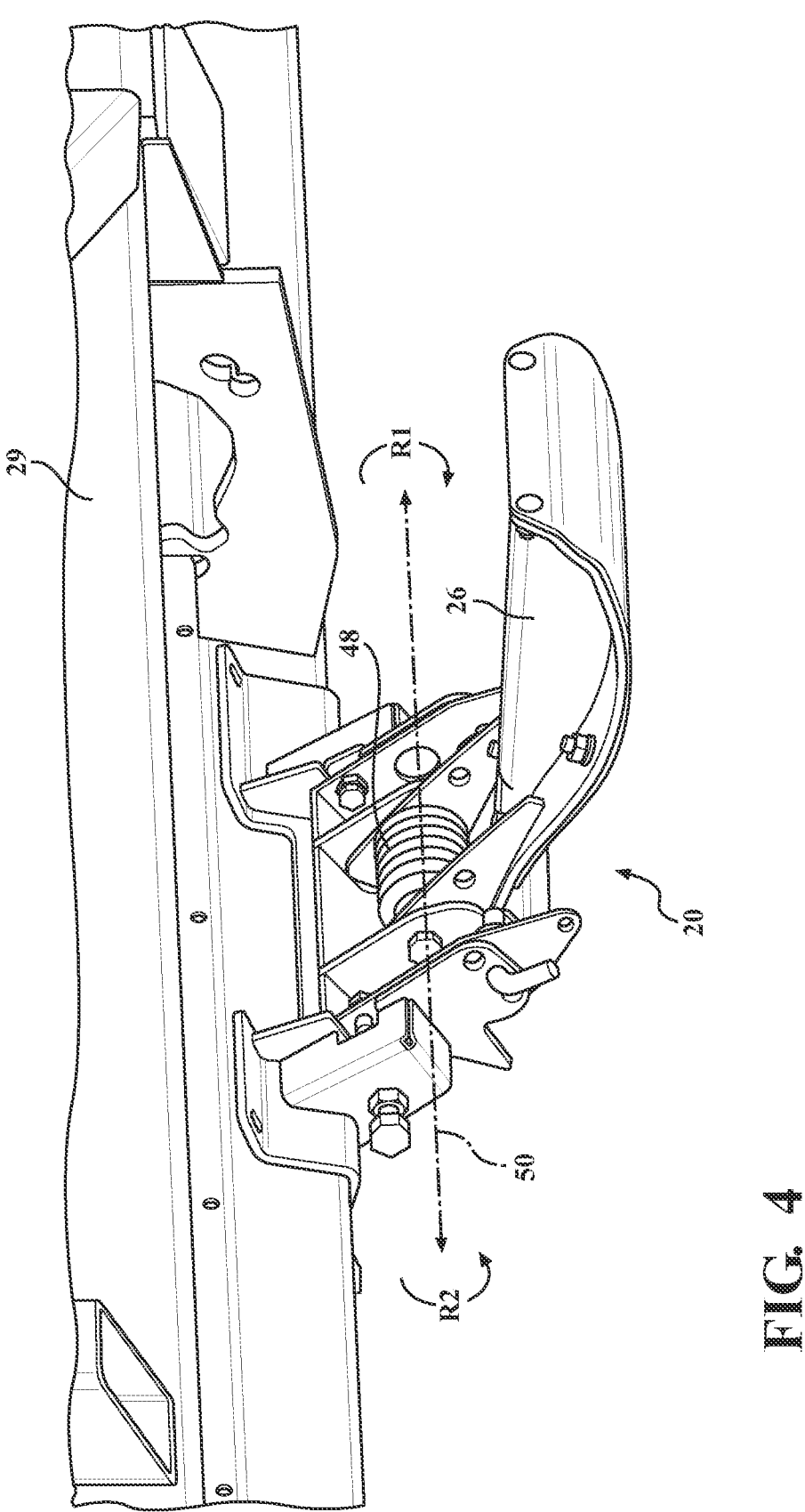
FIG. 4 is a perspective view of the stubble stomper with self-resetting breakaway feature according to a primary embodiment of the present invention with the stomper shoe in a pivoted position.

The stomper shoe 26 is pivotally attached to the hinge assembly 24. In the illustrated embodiment, the stomper shoe 26 is pivotally attached to the hinge assembly 24 by a bushing 46 and torsion spring 48. Alternatively, a pin or a bolt could be used. Each wall 44a, 44b of the stomper shoe 26 and each inner wall 34a, 34b of the hinge assembly 24 has an aperture to allow for attachment to each end 46a, 46b of the bushing 46. The torsion spring 48 surrounds the bushing 46. A stomper shoe pivot axis 50 is defined by an imaginary line that runs along the center of the length of the bushing 46 and extends out through each end 46a, 46b. The torsion spring 48 engages with the hinge assembly 24 and the stomper shoe 26 biasing the stomper shoe 26 about the stomper shoe pivot axis 50, as shown in FIGS. 2-4, in a first rotational direction R1. More specifically, a first end 48a of the torsion spring 48 engages with the stomper shoe 26 and an opposite second end 48b of the torsion spring 48 engages with the hinge assembly 24 to bias the stomper shoe 26 in the first rotational direction. For explanatory purposes, referring to FIG. 3, the first rotational direction R1 is in a downward, or clockwise, direction toward the ground when the stubble stomper 20 is mounted to the header frame 28 of the crop harvesting header 29. However, the stubble stomper 20 does not need to be mounted on the header 29 for the torsion spring 48 to exert the biasing force against the stomper shoe 26.

A spring pin 52 is attached to the stomper mounting bracket 22 and removably engages with a slot or aperture 54 in the first outer parallel wall 32a of the hinge assembly 24. The spring pin 52 has a first end with a head 52a and an opposite second chamfered end 52b. The chamfered end 52b can be either pointed or rounded. The spring pin first end 52a is mounted to a support structure 56 formed in the mounting bracket 22 such that it slidingly moves inwardly and outwardly through recesses in the mounting bracket support structure 56. When the stubble stomper 20 is in a default, or non-breakaway position, the pointed end 52*b* of the spring pin 52 fits within the slot 54 in the first outer parallel wall 32*a* of the hinge assembly 24. A spring 53 is attached to the spring pin 52 and compressed between the support structure 56 and a nut 59 for biasing the spring pin 52 into engagement with the slot 54. That is, the force of the spring 53 biases the chamfered end 52*b* of the spring pin into the slot 54 in the first outer parallel wall 32*a* of the hinge assembly 24. It should be appreciated that a second spring pin having a similar configuration may engage the second outer parallel wall 32*b* of the mounting bracket 22 and second outer parallel wall 32*b* of the hinge assembly 24.

The stubble stomper 20 has a default operating position, which is referred to as a non-breakaway position, shown in FIGS. 1-3. When in the non-breakaway position, the spring pin 52 is engaged in the slot 54 in the outer wall 32*a* of the hinge assembly 24, specifically when the chamfered end 52*b* of the spring pin 52 is received within the slot 54 in the hinge assembly 24. When the chamfered end 52*b* of the spring pin 52 is positioned within the slot 54, the hinge assembly 24 and mounting bracket 22 are locked together from the bias force of the spring 53 that is attached to the spring pin 52. When in the default or non-breakaway position, the stomper shoe 26 pivots about axis 50 with respect to the hinge assembly 24 due to the torsion spring's 48 rotation about bushing 46 resulting in engagement with the stomper shoe 26 and the hinge assembly 24. The torsion spring 48 exerts a force on the stomper shoe 26 biasing it in the first rotational direction R1, also referred to as having an opposing resistance.

Figure 5:
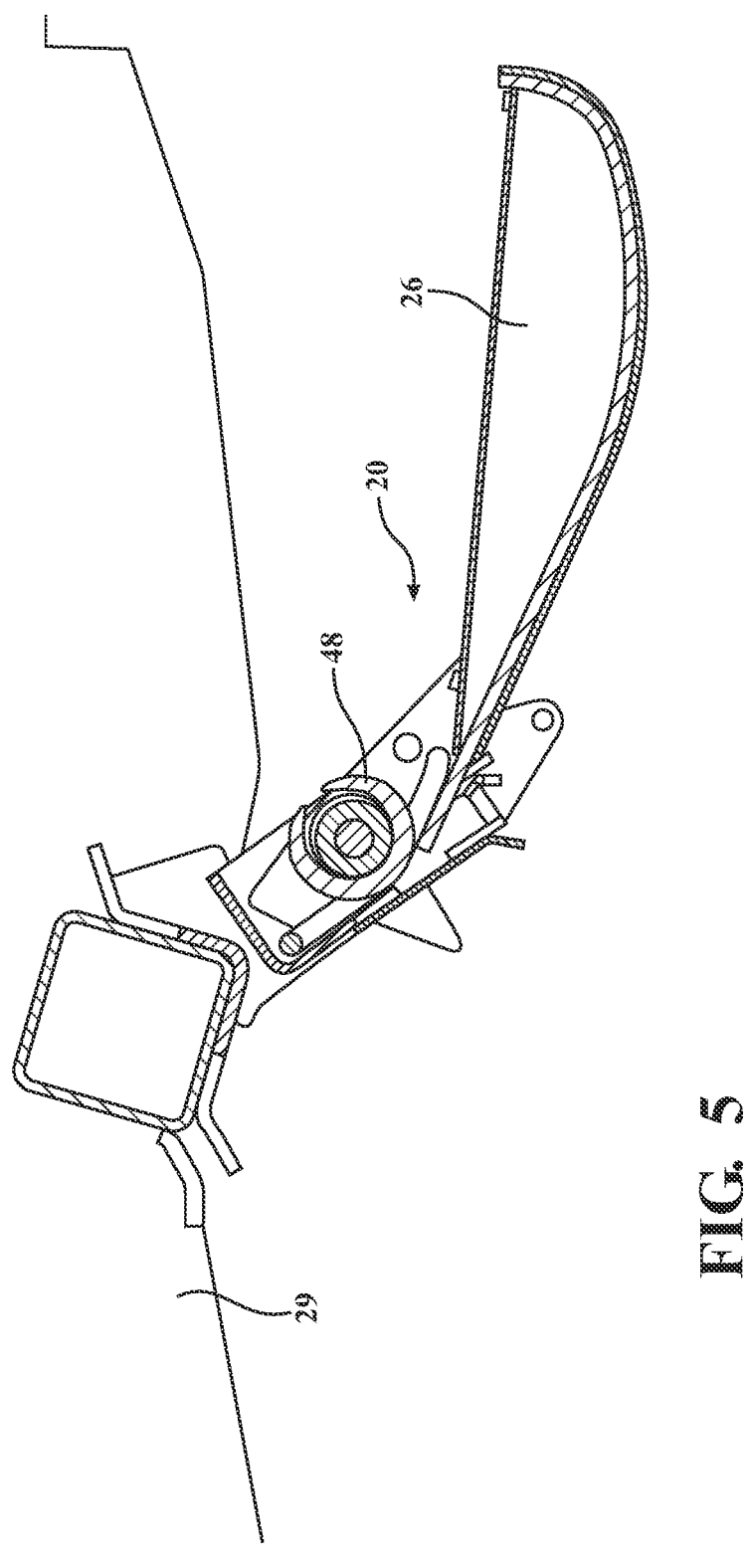
FIG. 5 is a side view of the stubble stomper shown in FIG. 4.

Referring to FIGS. 4-5, during normal operation when the agricultural machine is traveling in a forward direction, the stomper shoe 26 is simply spring biased by the torsion spring 48 to push down the cut crop stubble, for example corn stalks, against the ground. However, when the stomper shoe 26 encounters a force, for example a small obstruction such as a rock when the agricultural machine is moving across the field in a forward direction, the encountered force causes the stomper shoe 26 to pivot about pivot axis 50, defined by the length of the bushing 46, due to the impact force of the obstruction being greater than the bias force of the torsion spring 48. The encountered obstruction forces the stomper shoe 26 to pivot up by rotating about axis 50, in a second rotational direction R2, away from the ground, as shown in FIG. 4. Once the stubble stomper 26 has moved beyond the obstruction, the torsion spring 48 forces the stomper shoe 26 to pivot back down to its stomper shoe neutral position.

During normal operation when the agricultural machine is traveling in a reverse direction, the stomper shoe 26 is also spring biased by the torsion spring 48 in a downward direction toward the ground. However, referring to FIGS. 6-7, if the stubble stomper 20 encounters a force greater than a predetermined force, the spring pin 52 will disengage from the slot 54 in the outer wall 32*a* of the hinge assembly 24 and the hinge assembly 24 along with the attached stomper shoe 26 will rotate about axis 42, defined by aligned pivot pins 36*a*, 36*b*, in the first rotational direction R1 from its default position, into a breakaway position. The predetermined force is defined by the amount of force required to disengage the spring pin 52 from the slot 54 by compression of the spring 53 in the spring pin 52. When the spring 53 in the spring pin 52 encounters the predetermined force, the spring 53 compresses causing the spring pin 52 to move such that the chamfered end 52*b* of the spring pin 52 disengages from the slot 54. Once the chamfered end 52*b* of the spring pin 52 disengages from the slot 54, the hinge assembly 24 can pivot about rotational axis 42 defined by pivot pins 36*a*, 36*b*. Once the spring pin chamfered end 52*b* disengages from slot 54, the stubble stomper 20 transitions into the breakaway position. The first rotational direction is also referred to as a breakaway direction and, for reference purposes, is the same rotational direction as the torsion spring bias about axis 50, shown in FIGS. 1 and 3. This may occur, for example, when the stomper shoe 26 encounters an obstruction like a rock on the ground while the agricultural machine is moving in a reverse direction, as shown in FIG. 7, or if the shoe engages with the trailer when loading or unloading.

Figure 6:
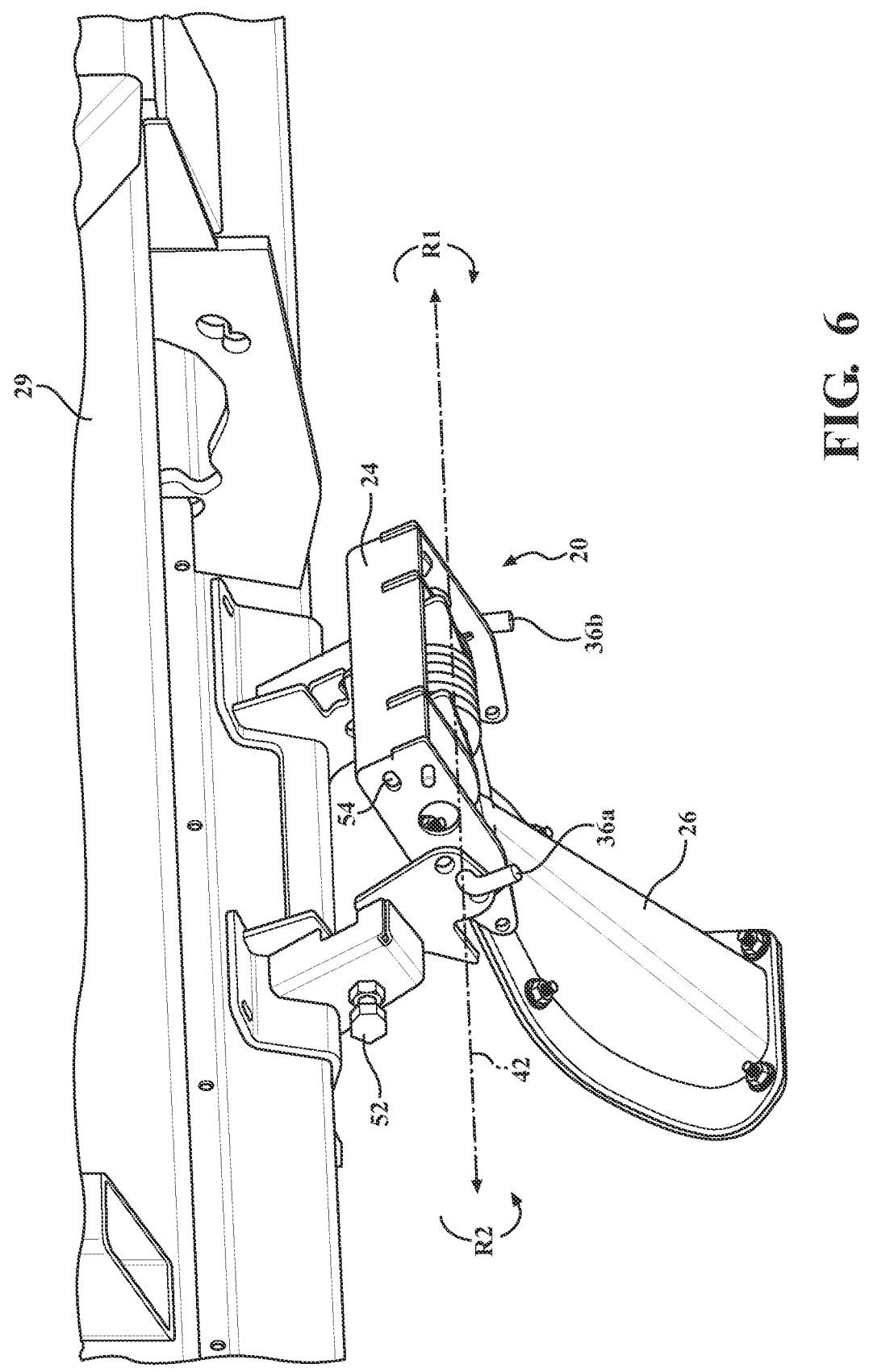
FIG. 6 is a perspective view of the stubble stomper with self-resetting breakaway feature according to a primary embodiment of the present invention in a breakaway position.
Figure 7:
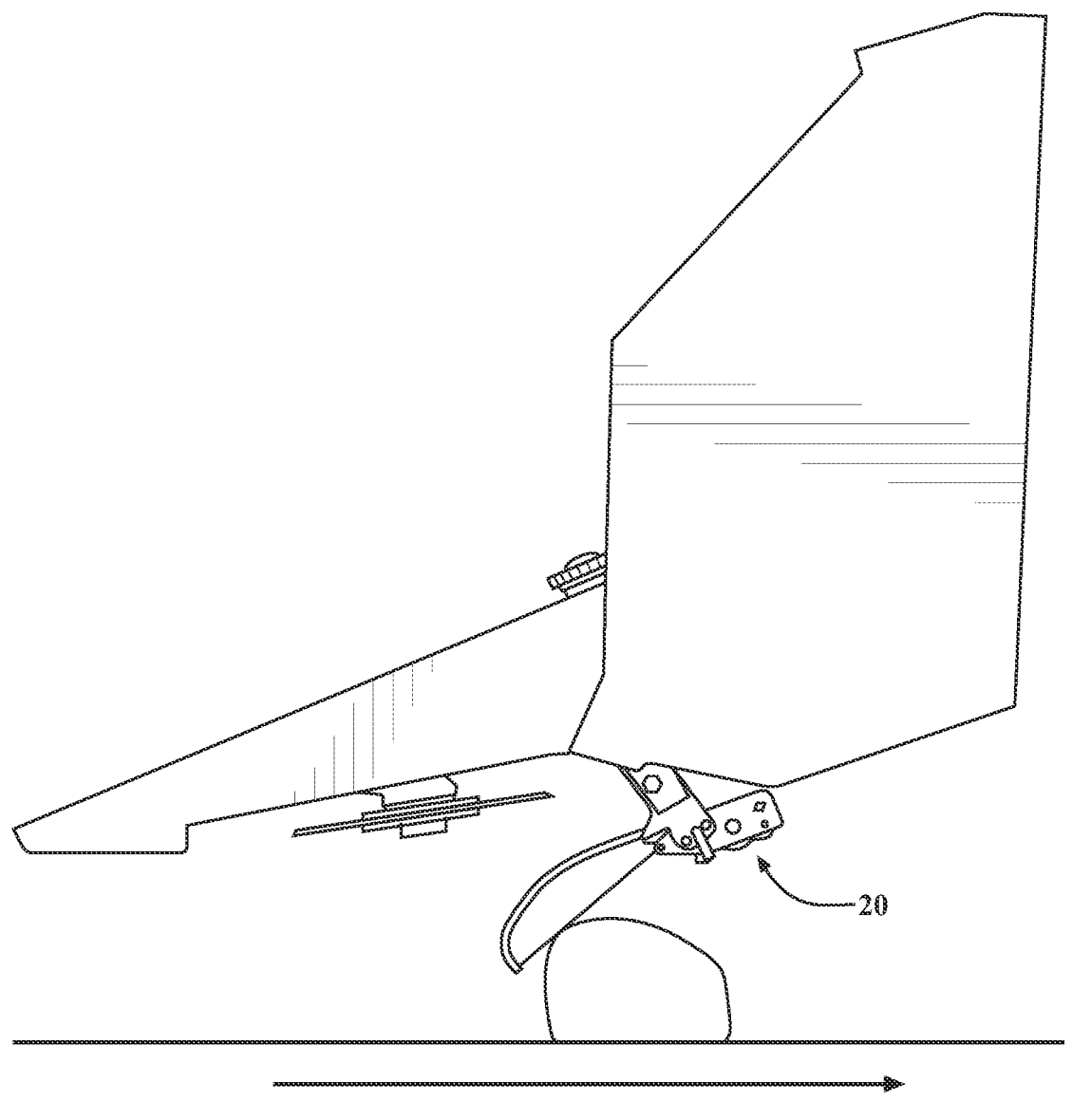
FIG. 7 is side view of the stubble stomper shown in FIG. 6.

FIG. 6 illustrates the stubble stomper 20 shifted to the breakaway position. The self-resetting feature takes place when the stubble stomper 20 resets to its default or non-breakaway position from the breakaway position. That is, when the agricultural machine resumes travel in the forward direction, the hinge assembly 24 and stomper shoe 26 will be forced, by engagement with the ground, to rotate in the second rotational direction R2 back into the default or non-breakaway position. During rotation in the second rotational direction, when the chamfered end 52*b* of the spring pin 52 realigns with slot 54, the bias force of spring 53 attached to spring pin 52 automatically forces the chamfered end 52*b* of spring pin 52 into the slot 54 to retain and reset the stubble stomper 20 to its default or non-breakaway position.

In the situation where the header 29 is raised from the ground with the hinge assembly 24 and stomper shoe 26 in the breakaway position, gravity alone is not enough to reset the stubble stomper 20 from the breakaway position back to the default position. However, when in the breakaway position and prior to engaging with the ground, gravity does cause the hinge assembly 24 to pivot vertically, due to the center of gravity directly below the pivot pin. Once the header 29 is lowered causing the stubble stomper 20 to contact the ground and when forward motion begins, the hinge assembly 24 and stomper shoe 26 will rotate about axis 42. When the chamfered end 52*b* of the spring pin 52 comes into alignment with slot 54 it will be automatically forced back into position within slot 54 by the spring 53 in the spring pin 52 transitioning and self-resetting the hinge assembly 24 and stomper shoe 26 from the breakaway position back to the default or non-breakaway position.

Stomper shoe axis 50, about which the stomper shoe 26 pivots with respect to the hinge assembly 24, and rotational axis 42, about which the hinge assembly 24 rotates between the default position and breakaway position with respect to the mounting bracket 22, extend parallel to each other as illustrated in FIG. 2. Further, referring to FIG. 1, the first rotational direction R1 for both axes 42, 50 is in a clockwise direction and the second rotational direction R2 is in a counter-clockwise direction.

Figure 8:
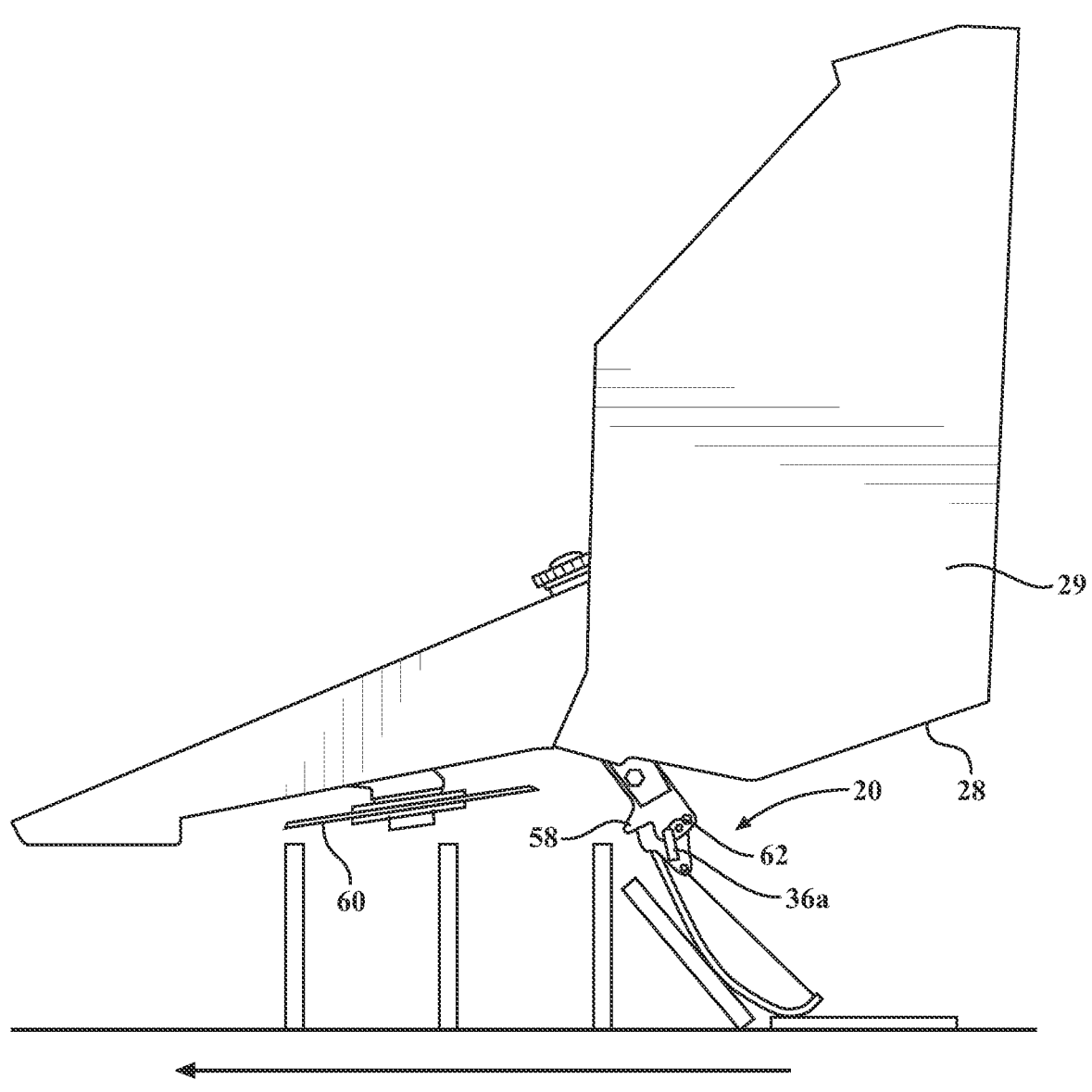
FIG. 8 is a side view of the stubble stomper in a lower height operating setting.
Figure 9:
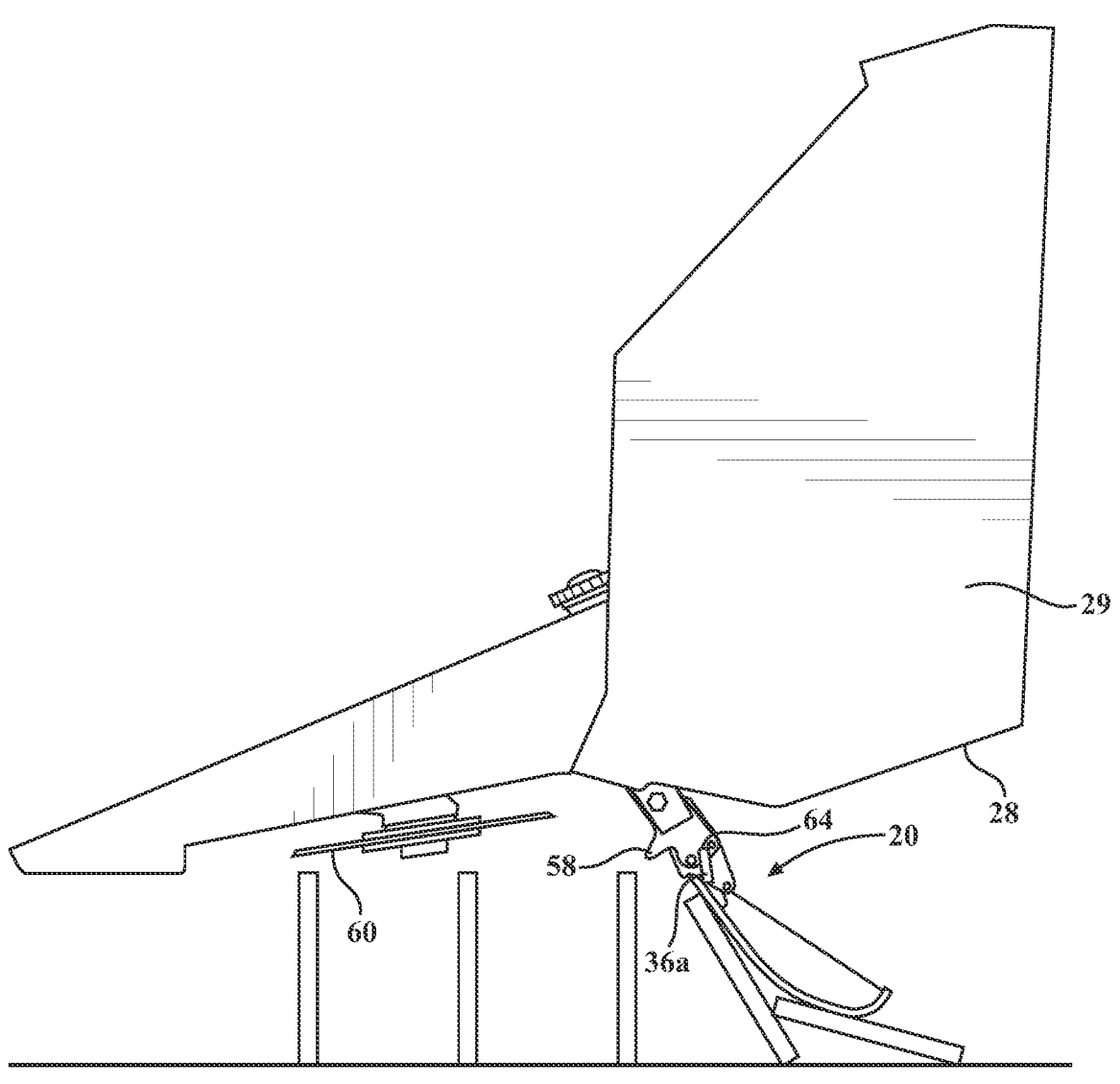
FIG. 9 is a side view of the stubble stomper in a middle height operating setting.
Figure 10:
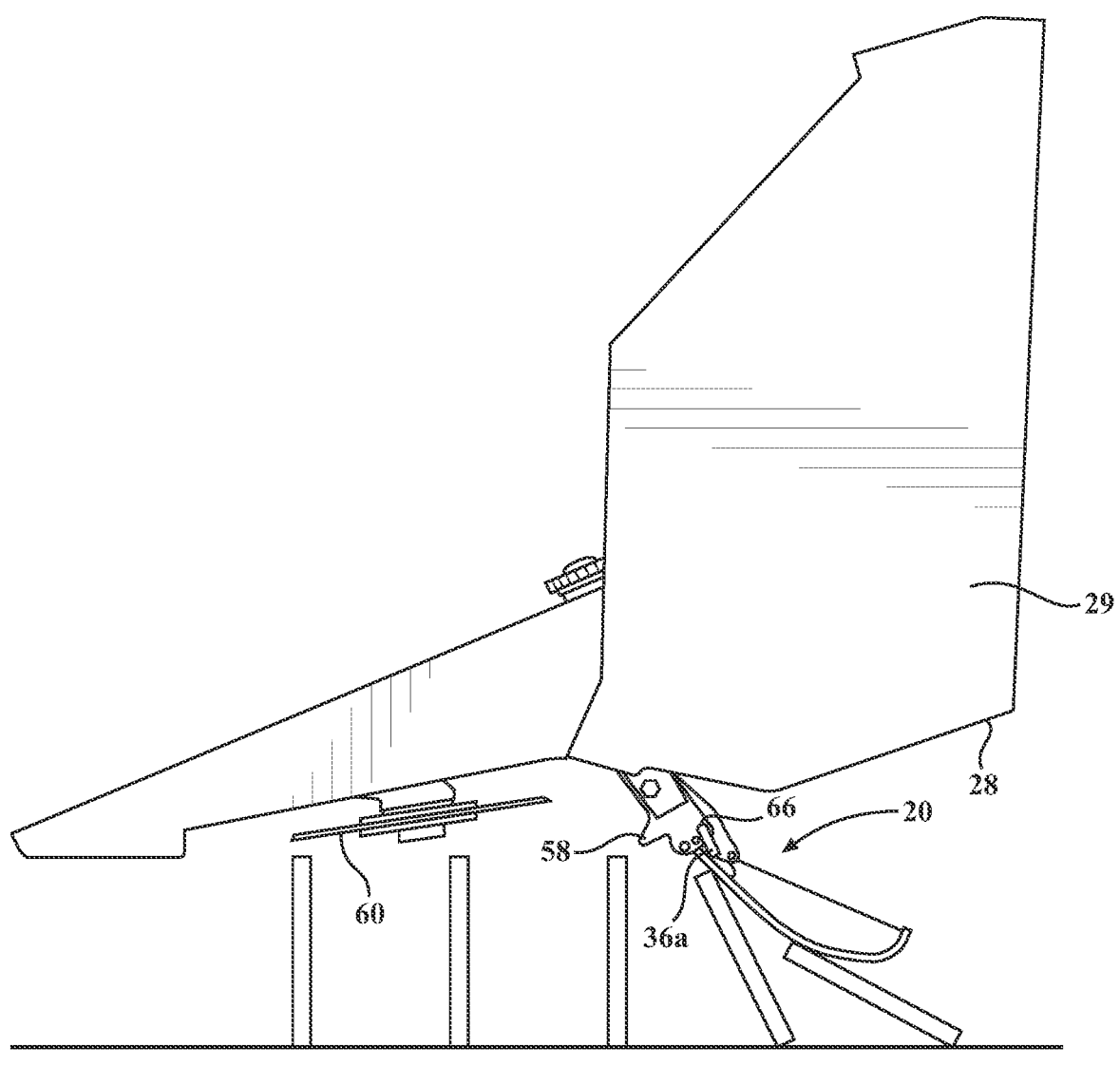
FIG. 10 is a side view of the stubble stomper in an upper height operating setting.

In operation, the stubble stomper 20 can be positioned at multiple heights relative to the ground, as shown in FIGS. 8-10. The mounting bracket 22 includes three pairs of operating position apertures, a set of low height setting apertures 62, a set of middle height setting apertures 64, and a set of upper height setting apertures 66. The pivot pins 36*a*, 36*b* will engage with one set of operating position apertures depending upon the desired height setting. FIG. 8 illustrates a stubble stomper 20 mounted on the crop harvesting header 29 at a low height setting, which is close to the ground. In this low height setting, the pivot pins 36*a*, 36*b* are received within the low height setting apertures 62 in the mounting bracket 22. FIG. 9 illustrates a stubble stomper 20 mounted on the crop harvesting header 29 at a middle height setting, which is higher from the ground than the low height setting. In this middle height setting, the pivot pins 36a, 36b are received within the middle height setting apertures 64. FIG. 10 illustrates a stubble stomper 20 mounted on the crop harvesting header 29 at an upper height setting, which is still higher from the ground than the middle height setting. In the upper height setting, the pivot pins 36a, 36b are received within the upper height setting apertures 66. The lower the stubble stomper 20 is mounted, meaning the closer to the ground that it is positioned, the more spring force that is applied resulting in more aggressive stomping force applied to the stalk bases. Alternatively, the higher the stubble stomper 20 is mounted, meaning the higher above the ground that it is positioned, the less spring force is applied resulting in less aggressive stomping force applied to the stalk bases.

A stop 58 can be incorporated into the mounting bracket 22, as shown in FIGS. 8-10, that limits the pivotal motion of the hinge assembly 24 angle range when in the breakaway position to avoid contact with the cutterbar 60. Further, referring to FIG. 1, preferably the clearance between the outer parallel wall 32c of the hinge assembly 24 and the third wall 30c of the mounting bracket 22 is minimized to prevent sediment from building up to allow for free motion of the hinge assembly 24 into the breakaway position.

Referring to FIGS. 11-29, a second embodiment of the stubble stomper with self-resetting breakaway feature is shown generally at 120. The stubble stomper 120 includes a stomper mounting bracket 122, a hinge assembly 124 rotatably attached to the stomper mounting bracket 122 and rotatable between a default position and a breakaway position, and a stomper shoe 126 pivotally attached to the hinge assembly 124. The main differences between the second embodiment and the first embodiment are the addition of a clamp plate 151 that preloads the torsion spring 148 and a storage or transport position of the stomper shoe 126.

The stomper mounting bracket 122 attaches to the main frame of a crop harvesting header 29 on an agricultural machine, for example a corn header, in a conventional manner. The mounting bracket 122 includes two protruding parallel walls 130a, 130b that are spaced apart by a first distance AD1. A mounting bracket third wall 130c extends between the two parallel walls 130a, 130b and mounts abutted adjacent to the main frame of the header 29.

The hinge assembly 124 includes two sets of protruding parallel walls, an outer set 132a, 132b and an inner set 134a, 134b. The outer set of parallel walls 132a, 132b are spaced apart by a second distance AD2. The second distance AD2 is less than the first distance AD1 between the two parallel walls 130a, 130b of the mounting bracket 122. As a result, the outer parallel walls 132a, 132b of the hinge assembly 124 fit within the parallel walls 130a, 130b of the mounting bracket 22.

The hinge assembly 124 is rotatably attached to the stomper mounting bracket 122 by a pair of pins 136a, 136b. The first parallel wall 130a of the mounting bracket 122 has a first pivot pin aperture 138a. There is a first enclosed receptacle 135a that spans between the first outer parallel wall 132a and first inner parallel wall 134a of the hinge assembly 124 that receives the first pivot pin 136a. A first locking pin 137a is received within a locking pin aperture 139a in the first receptacle 135a and through the first pin 136a. The second parallel wall 130b of the mounting bracket 122 has a second pivot pin aperture 138b. There is a second enclosed receptacle 135b that spans between the second outer parallel wall 132b and the second inner parallel wall 134b of the hinge assembly 124 that receives the second pivot pin 136b. A second locking pin 137b is received within a locking pin aperture 139b in the second receptacle 135b and through the second pin 136b. The alignment of the pivot pins 136a, 136b through the pivot pin apertures 138a, 138b and the enclosed receptacles 135a, 135b define a hinge assembly rotational axis 142 about which the hinge assembly 124 rotates relative to the mounting bracket 122 when moving from a default, or non-breakaway position to a breakaway position.

The inner set of parallel walls 134a, 134b of the hinge assembly 124 are spaced apart by a third distance AD3. The third distance AD3 is less than the second distance AD2 between the outer parallel walls 132a, 132b of the hinge assembly 124.

The stomper shoe 126 also includes a pair of protruding parallel walls 144a, 144b. The parallel walls 144a, 144b are spaced apart by a fourth distance, AD4, that is less than the hinge assembly inner parallel walls third distance, AD3. As a result, the parallel walls 144a, 144b of the stomper shoe 126 fit within the inner parallel walls 134a, 134b of the hinge assembly 124.

The stomper shoe 126 is pivotally attached to the hinge assembly 124. In the illustrated embodiment, the stomper shoe 126 is pivotally attached to the hinge assembly 124 by a bushing 146 and torsion spring 148. Alternatively, a pin or a bolt could be used. Each wall 144a, 144b of the stomper shoe 126 and each inner wall 134a, 134b of the hinge assembly 124 has an aperture to allow for attachment to each end 146a, 146b of the bushing 146. The torsion spring 148 surrounds the bushing 146. A stomper shoe pivot axis 150 is defined by the imaginary line that runs along the center of the length of the bushing 146 and extends out through each end 146a, 146b. The torsion spring 148 engages with the hinge assembly 124 and the stomper shoe 126 biasing the stomper shoe 126 in a first rotational direction R1, shown in FIG. 11, about the stomper shoe pivot axis 150. More specifically, a first end 148a of the torsion spring 148 engages with the stomper shoe 126 and a second end 148b of the torsion spring 148 engages with the hinge assembly 124 to bias the stomper shoe 126 in the first rotational direction R1. For explanatory purposes, the first rotational direction R1 is in a downward direction when the stubble stomper 120 is mounted to the main frame of the crop harvesting header 29.

Referring to FIGS. 13-17, a clamp plate 151 is attached to the hinge assembly 124 to preload the torsion spring 148. In the illustrated embodiment, the clamp plate 151 is bolted to the hinge assembly 124 by bolts 153. The clamp plate 151 is positioned to force the stomper shoe 126 in an upward motion, or in the second rotational direction R2, relative to the hinge assembly 124 during assembly of the clamp plate 151 to the hinge assembly 124 to coil and preload the torsion spring 148. The preload provides instant down pressure when the ground or stubble is contacted by the stomper shoe 126. Preloading the torsion spring 148 results in the torsion spring 148, and the stomper shoe 126, having a higher initial downward force, in the first rotational direction R1 to more effectively interact with the crop stubble by forcing it down with a more consistent and higher torque than if the torsion spring 148 were not preloaded. In the scenario where the torsion spring 148 is not pre-loaded, the torsion spring 148 begins rotating with zero torque and builds torque as it rotates. When the torsion spring 148 is preloaded, it provides more consistent torque to force down the crop stubble. Further, a softer spring can be used rather than a stiffer spring because a softer spring will have less variation throughout movement, where a stiffer spring would have more variation during movement. Therefore, a softer spring provides more consistent torque during operation than a stiffer spring.

To assemble the clamp plate 151 onto the hinge assembly 124 and put the torsion spring 148 into a preloaded position, two tabs 151a, 151b, (illustrated in FIG. 13) that are integral with a first edge 151c of the clamp plate 151 are received within two slots 124s in the hinge assembly 124. The tabs 151a, 151b within the slots 124s act as a hinge as the bolts 153 received through apertures in the clamp plate 151 are being bolted to the hinge assembly 124. As the bolts 153 are being tightened, a lower portion 151d of the clamp plate 151 interacts with a lower surface 126L of the stomper shoe 126 while an opposing, upper surface 126U of the stomper shoe 126 interacts with the first end 148a of the torsion spring 148 causing preloading of the torsion spring 148 by forcing the stomper shoe 126 and the first end 148a of torsion spring 148 to rotate in the second rotational direction R2 until the bolts 153 are tightened while the second end 148b of torsion spring 148 remains in a fixed position abutted against the hinge assembly 124.

Figure 18:
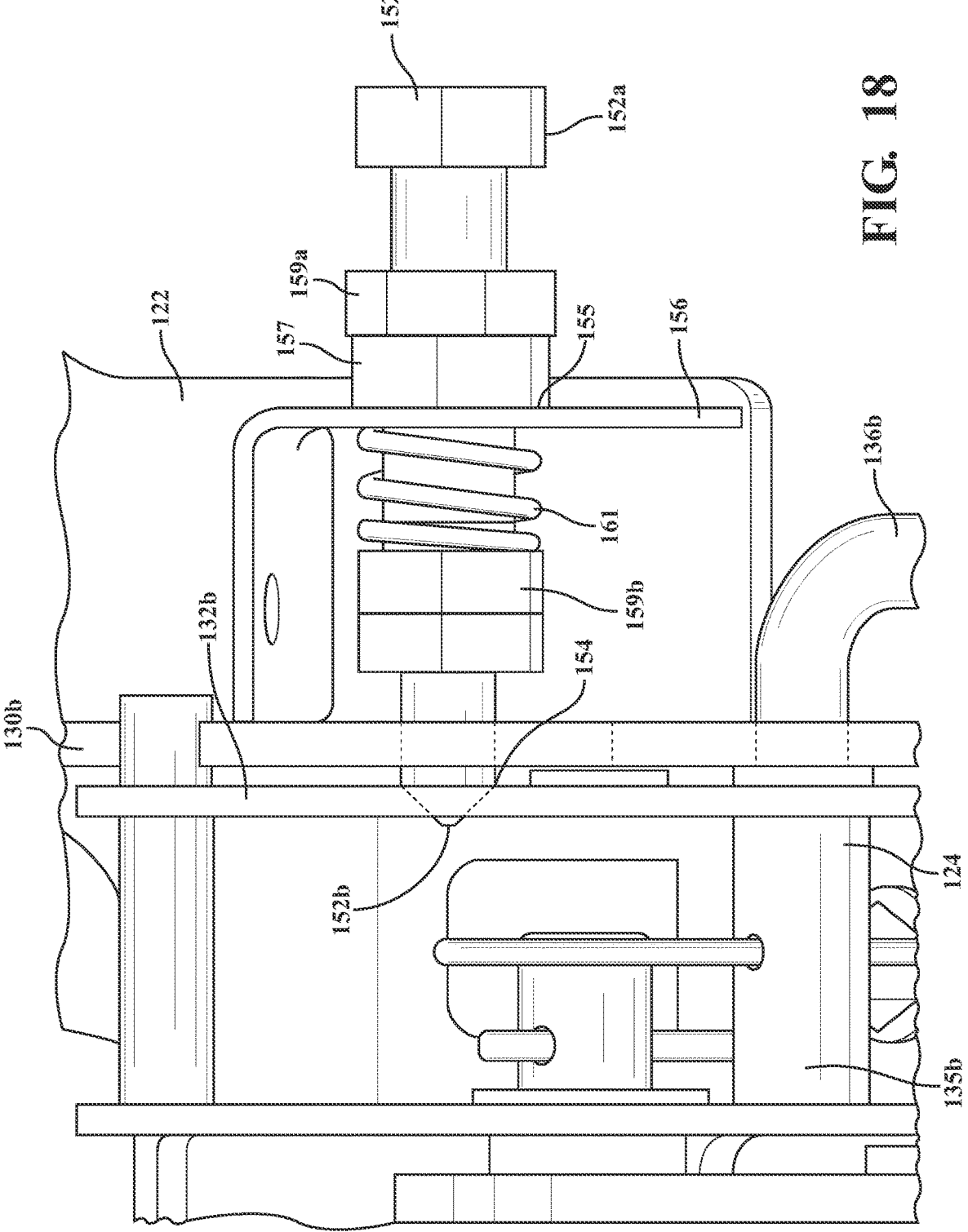
FIG. 18 is a cutaway, side view of the stubble stomper shown in FIG. 11 showing the spring pin.

Referring to FIG. 18, a spring pin 152 is attached to the stomper mounting bracket 122 and removably engages with a slot or aperture 154 in the second outer parallel wall 132b of the hinge assembly 124. The spring pin 152 has a first end with a head 152a and an opposite second chamfered end 152b. The chamfered end 152b can be either pointed or rounded. The spring pin first end 152a is mounted to a support structure 156 formed in the mounting bracket 122 such that it slidingly moves inwardly and outwardly through a recess 155 in the mounting bracket support structure 156 due to a spring 161 attached to the spring pin 152. On the outside of the support structure 156, a nut 157 and a washer 159a are attached to the spring pin 152. Positioned between the inside of the support structure 156 and the outside of second protruding stomper wall 130b, a nut/washer 159b is attached to the spring pin 152 adjacent to the spring 161. When the stubble stomper 120 is in a default, or non-breakaway position, the chamfered end 152b of the spring pin 152 fits within the slot 154 in the first outer parallel wall 132a of the hinge assembly 124. The spring 161 is compressed between the support structure 156 and the nut/washer 159b for biasing the spring pin 152 into engagement with the slot 154. That is, the force of the spring 161 biases the chamfered end 152b of the spring pin 152 into the slot 154 in the second outer parallel wall 132b of the hinge assembly 124. It should be appreciated that a second spring pin having a similar configuration may engage the first outer parallel wall 132a of the mounting bracket 122 and first outer parallel wall 132a of the hinge assembly 124.

The stubble stomper 120 has a default operating position, which is referred to as a non-breakaway position. When in the non-breakaway position, the spring pin 152 is engaged in the slot 154 in the outer wall 132b of the hinge assembly 124. This engagement occurs when the chamfered end 152b of the spring pin 152 is received within the slot 154 in the hinge assembly 124. When the chamfered end 152b of the spring pin 152 is positioned within the slot 154, the hinge assembly 124 and mounting bracket 122 are locked together from the bias force of the spring 161 attached to the spring pin 152. When in the default or non-breakaway position, the stomper shoe 126 is able to pivot about axis 150 with respect to the hinge assembly 124 due to the torsion spring's 148 rotation about bushing 146 resulting in engagement with the stomper shoe 126 and the hinge assembly 124. The torsion spring 148 exerts a force on the stomper shoe 126 biasing it in the first rotational direction R1 and is preloaded by the attachment of the clamp plate 151. For explanatory purposes, the first rotational direction R1 is a downward direction toward the ground when the stubble stomper 120 is mounted on the main frame 28 of the crop harvesting header 29. However, the stubble stomper 120 does not need to be mounted on a crop harvesting header 29 for the preloaded torsion spring 148 to exert the biasing force.

Figure 11:
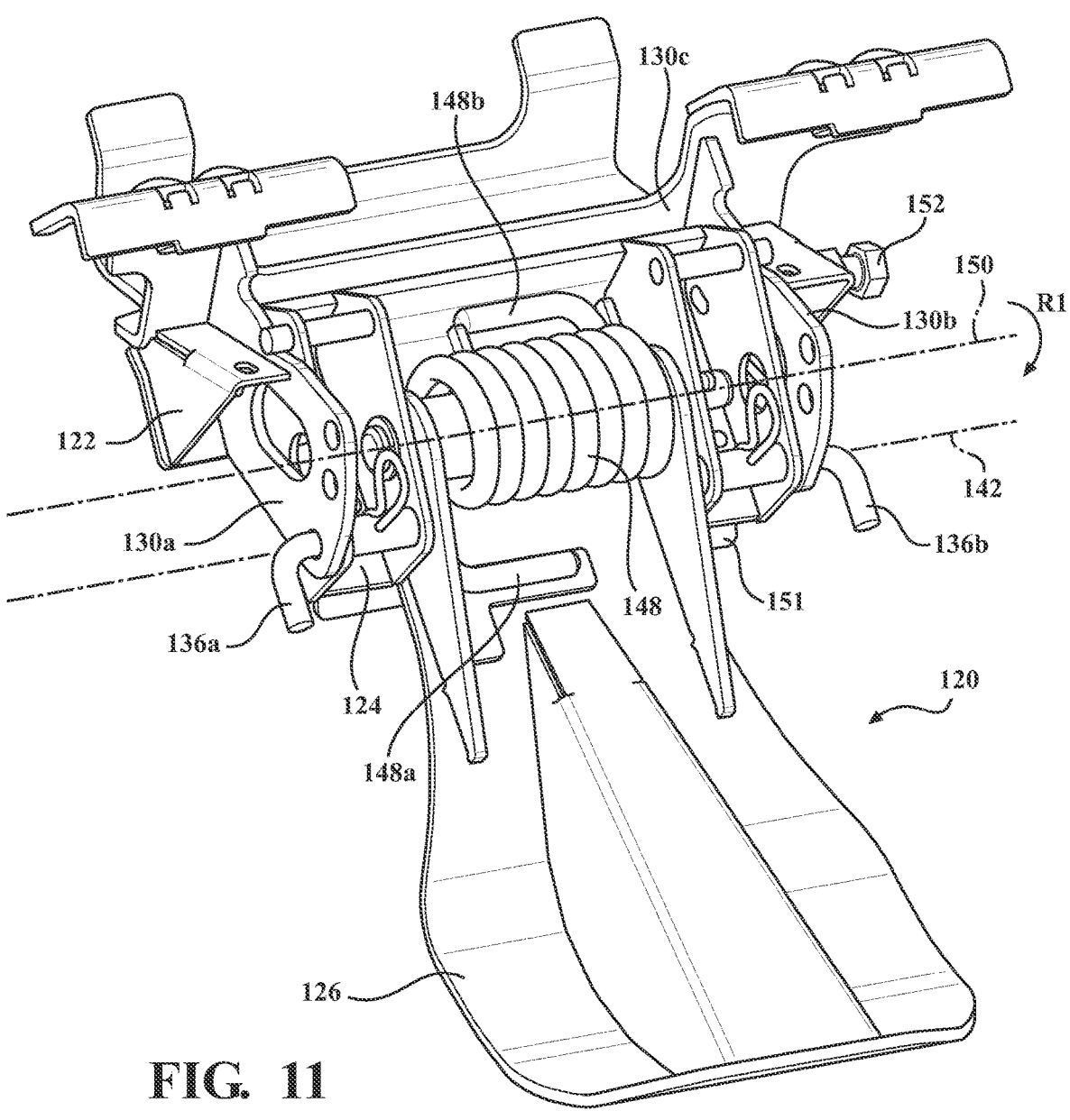
FIG. 11 is a rear perspective view of a second embodiment of the stubble stomper.
Figure 12:
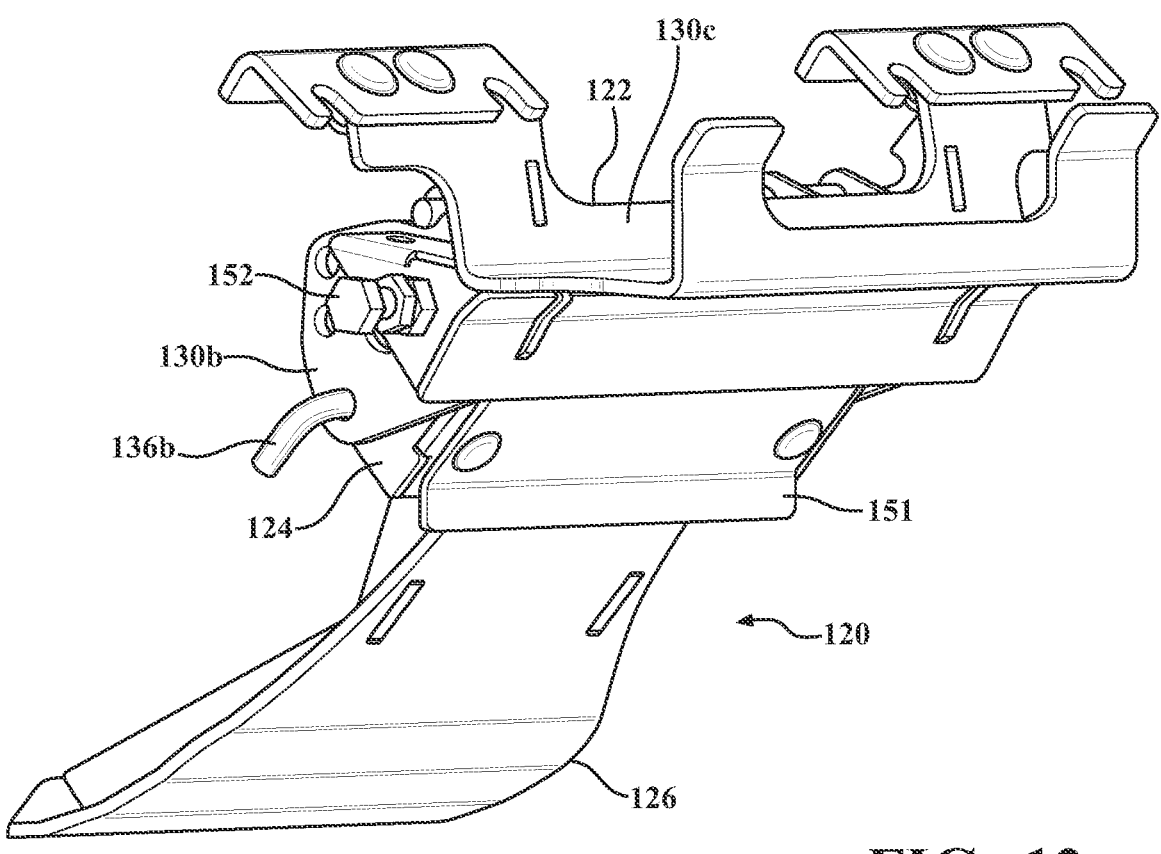
FIG. 12 is a front perspective view of the stubble stomper shown in FIG. 11.
Figure 13:
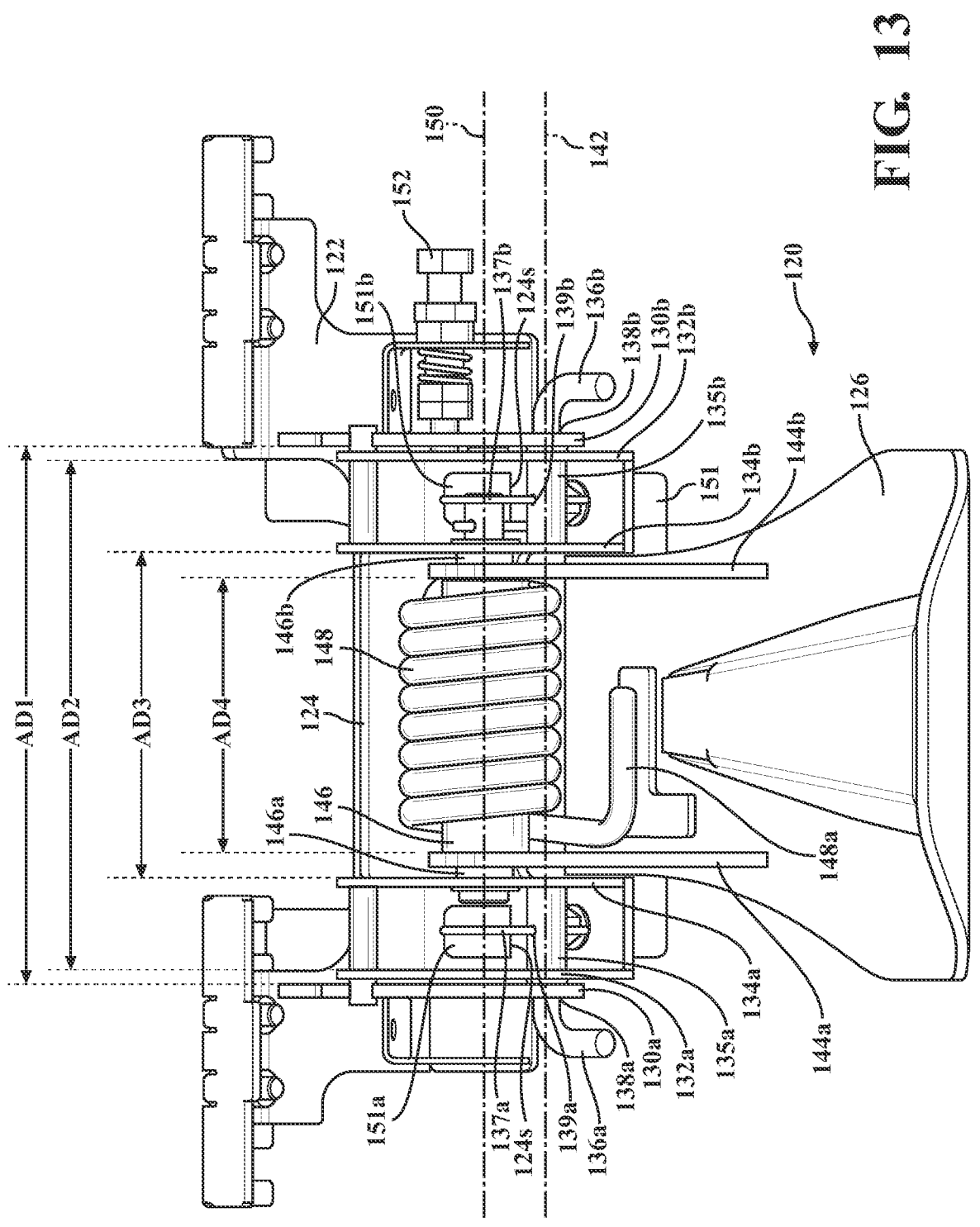
FIG. 13 is a rear view of the stubble stomper shown in FIG. 11; clamp plate.
Figure 15:
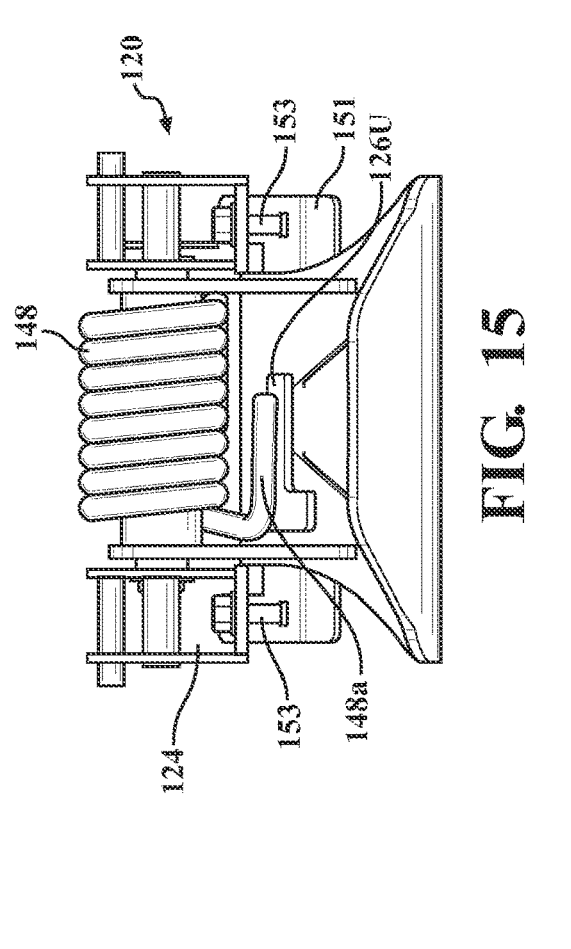
Figure 17:
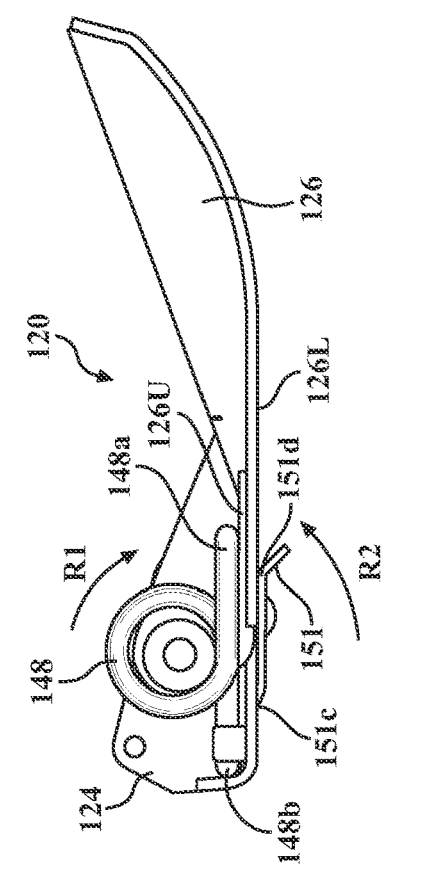
FIG. 17 is a cutaway, side view of the stubble stomper shown in FIG. 14 showing the torsion spring and the clamp plate pivoted upwardly.
Figure 14:
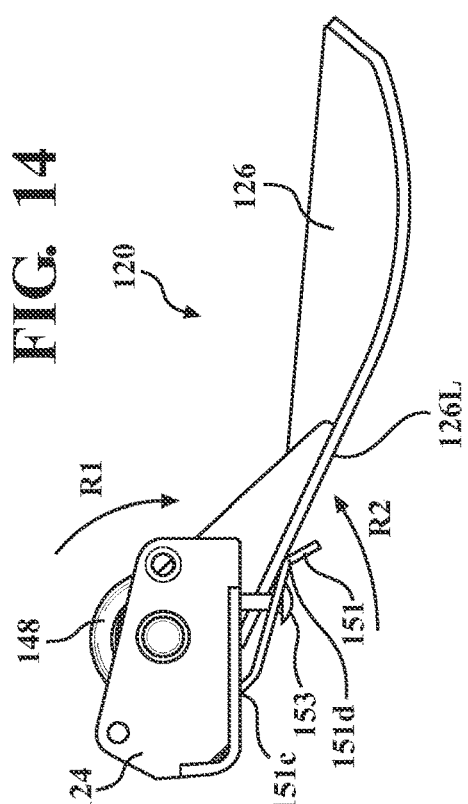
FIG. 14 is a side view of the stubble stomper shown in FIG. 11 showing the FIG. 15 is a rear view of the stubble stomper shown in FIG. 14.
Figure 16:
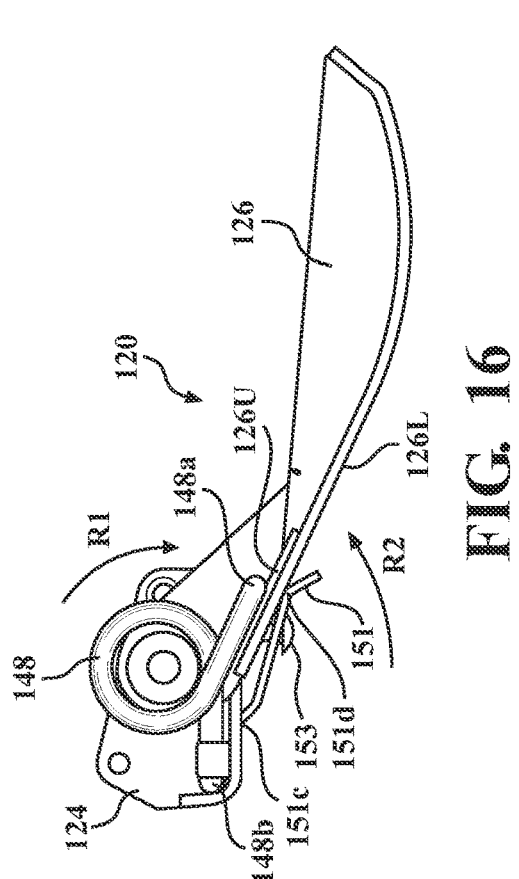
FIG. 16 is a cutaway, side view of the stubble stomper shown in FIG. 14 showing the torsion spring and the clamp plate.
Figure 19:
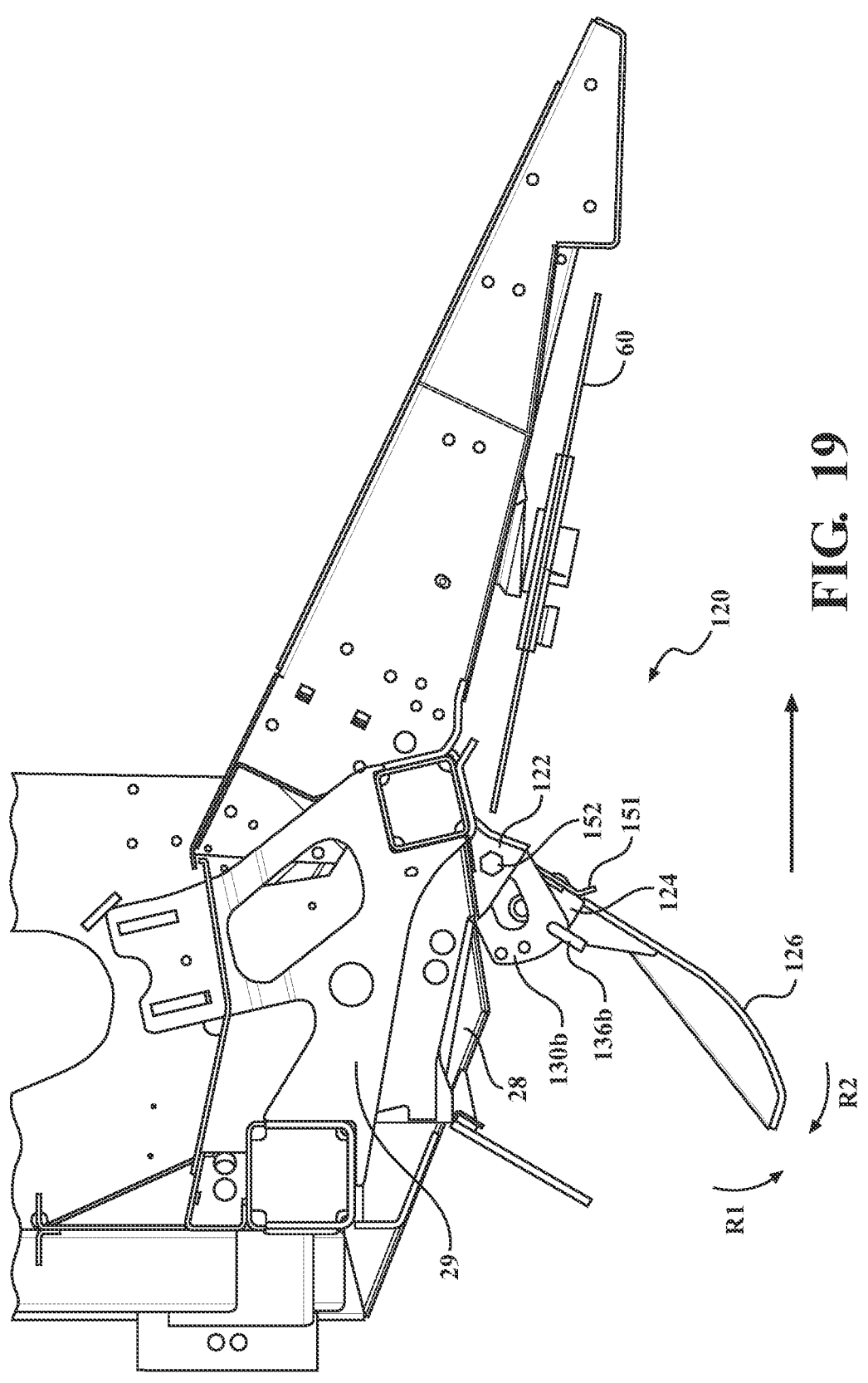
FIG. 19 is a side view of the stubble stomper shown in FIG. 11 in a lower position attached to an agricultural machine moving in a forward direction.

Referring to FIGS. 11 and 19, during normal operation when the agricultural machine is traveling in a forward direction, the stomper shoe 126 is spring biased by the combination of the torsion spring 148 and clamp plate 151 to push down the cut crop stubble, for example corn stalks, against the ground. However, when the stomper shoe 126 encounters a force, for example a small obstruction such as a rock when the agricultural machine is moving across the field in a forward direction, the encountered force causes the stomper shoe 126 to pivot about pivot axis 150 (illustrated in FIG. 11) due to the impact force of the obstruction being greater than the bias force of the torsion spring 148. The encountered obstruction forces the stomper shoe 126 to pivot up by rotating in the second rotational direction R2, away from the ground, about axis 150. Once the stubble stomper 26 has moved beyond the obstruction, the torsion spring 48 forces the stomper shoe 126 to pivot back down, in the first rotational direction R1, to its neutral or default position.

During normal operation when the agricultural machine is traveling in a reverse direction, the stomper shoe 126 is also spring biased by the preloaded torsion spring 148 in a downward direction toward the ground. However, in the reverse direction, engagement with the ground causes the stomper shoe 126 to continue pivoting in the first rotational direction R1 upwardly toward the cutterbar 60.

Figure 20:
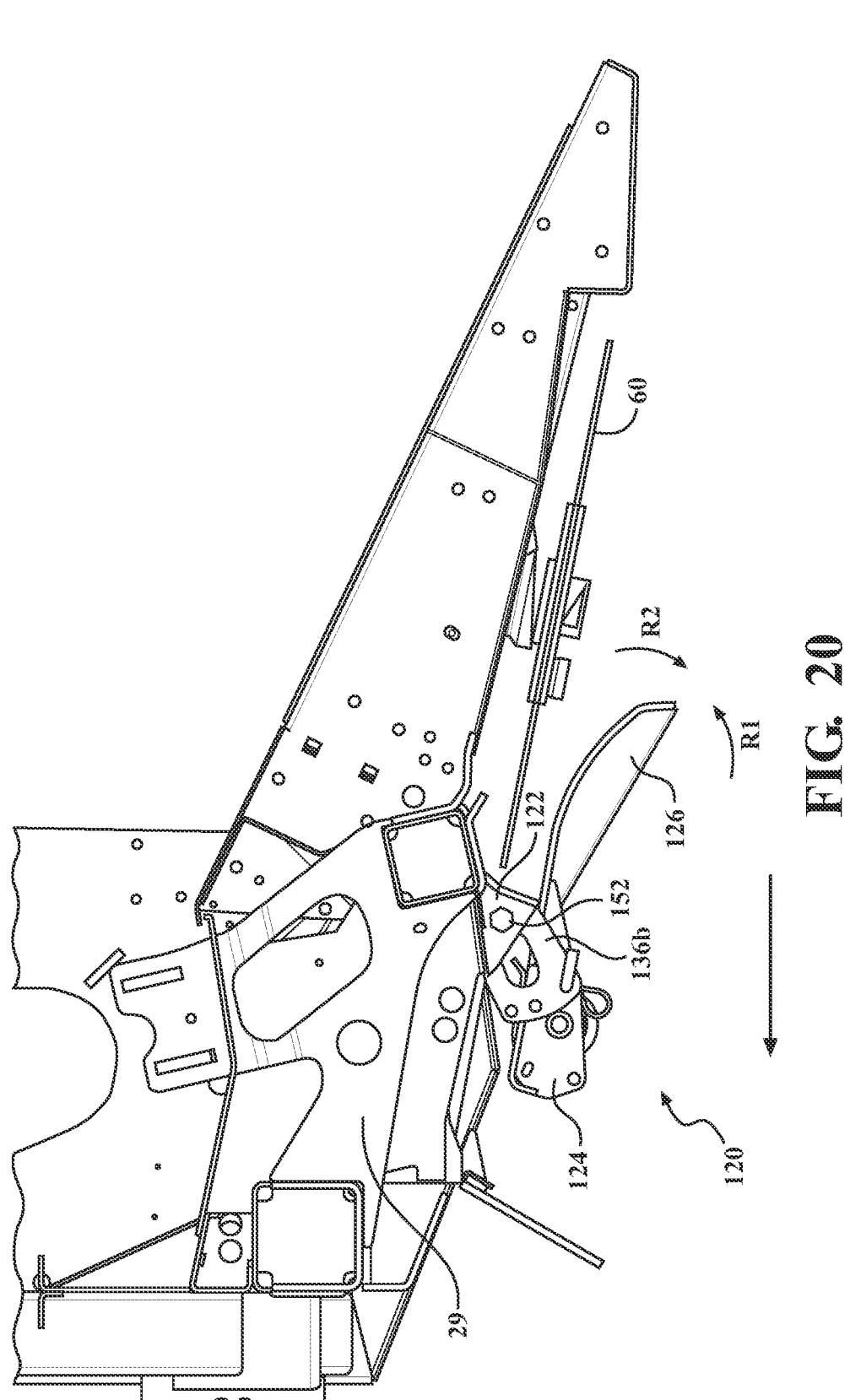
FIG. 20 is a side view of the stubble stomper shown in FIG. 11 in a lower position and in a breakaway position attached to an agricultural machine moving in a reverse direction.
Figure 21:
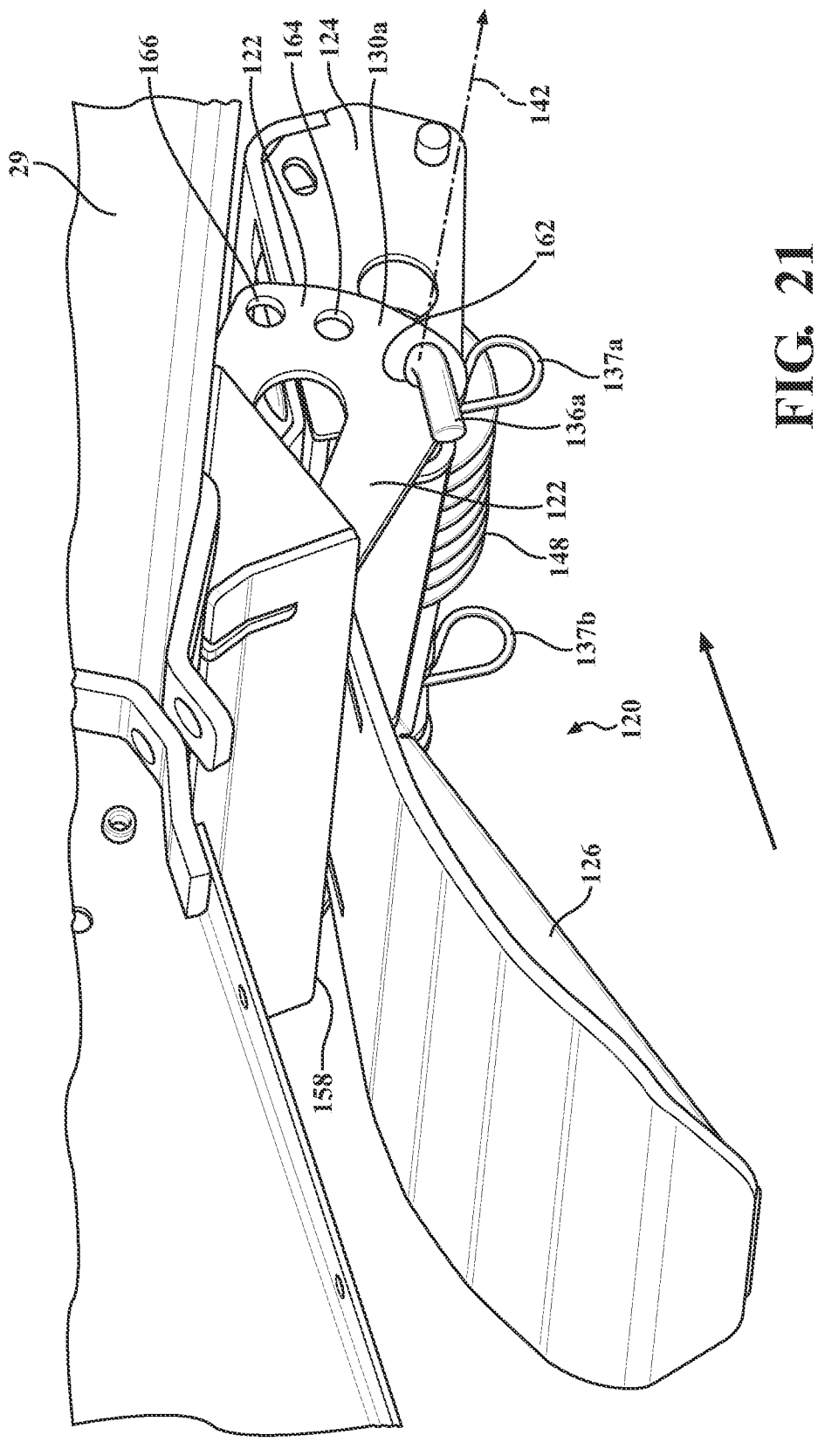
FIG. 21 is a front perspective view of the stubble stomper shown in FIG. 20.
Figure 22:
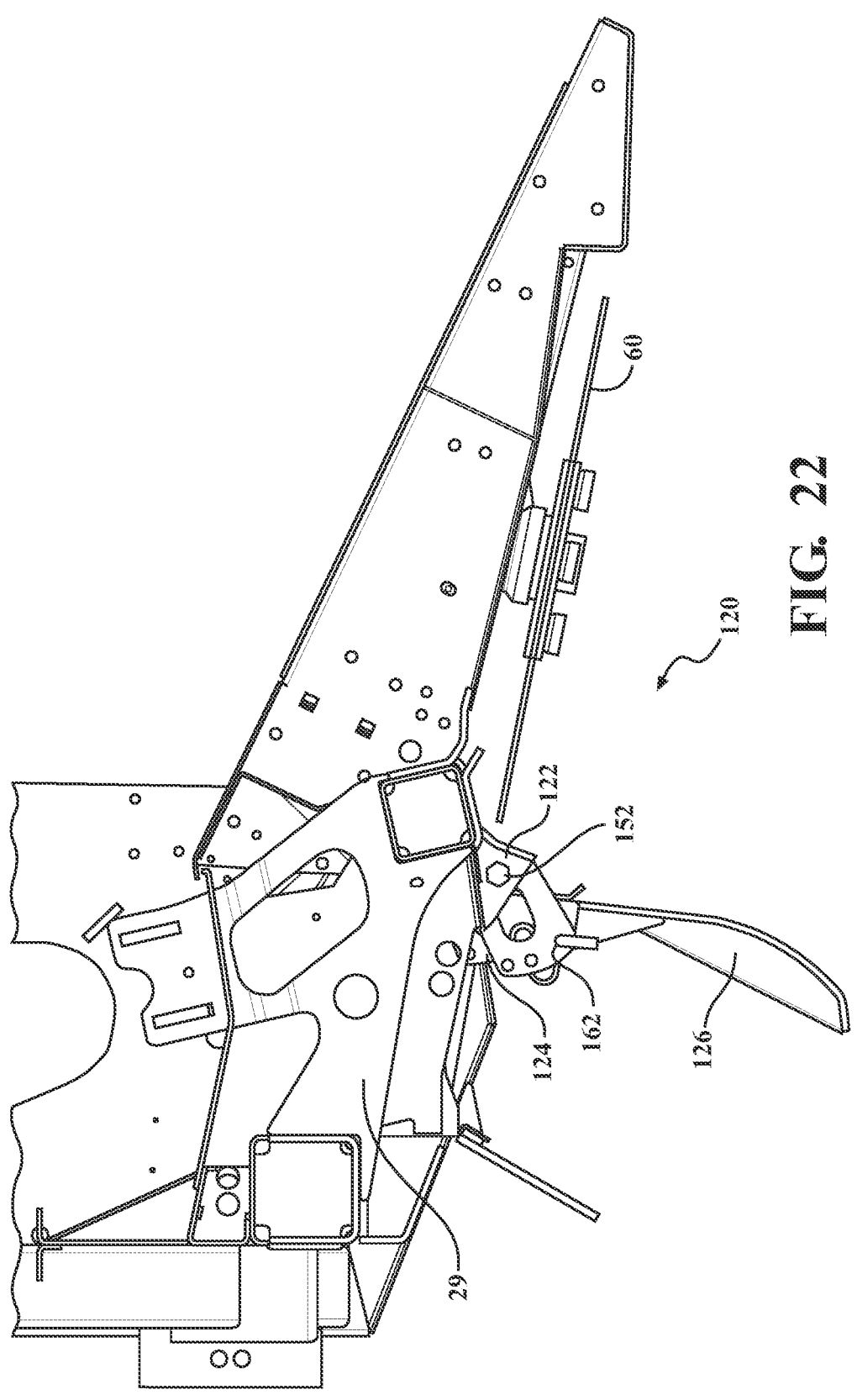
FIG. 22 is a side view of the stubble stomper shown in FIG. 11 in a lower position attached to an agricultural machine and in a breakaway position.
Figure 23:
FIG. 23 is a side view of the stubble stomper shown in FIG. 11 in a middle height setting attached to an agricultural machine moving in a forward direction.
Figure 24:
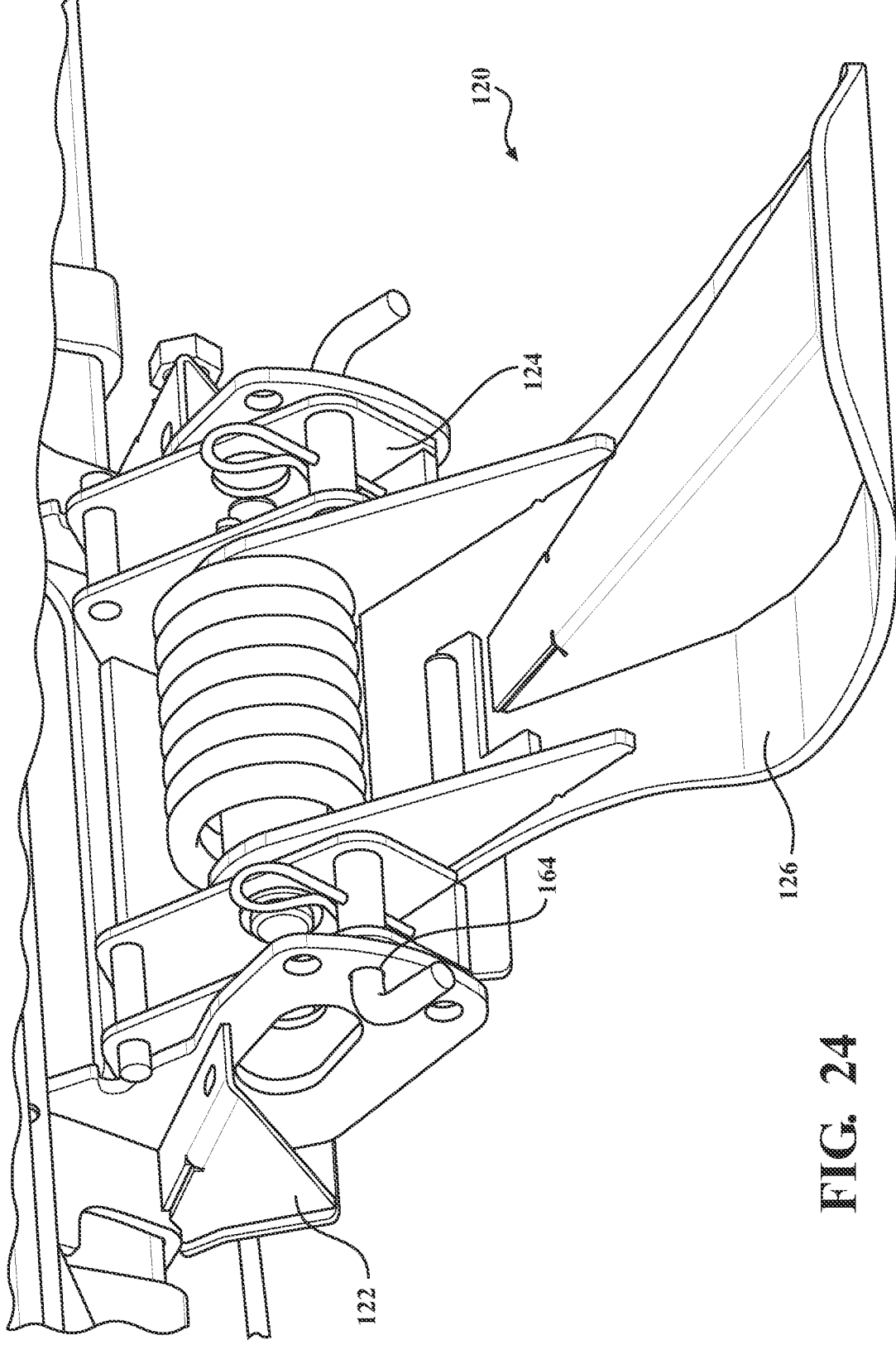
FIG. 24 is a rear perspective view of the stubble stomper shown in FIG. 23.
Figure 25:
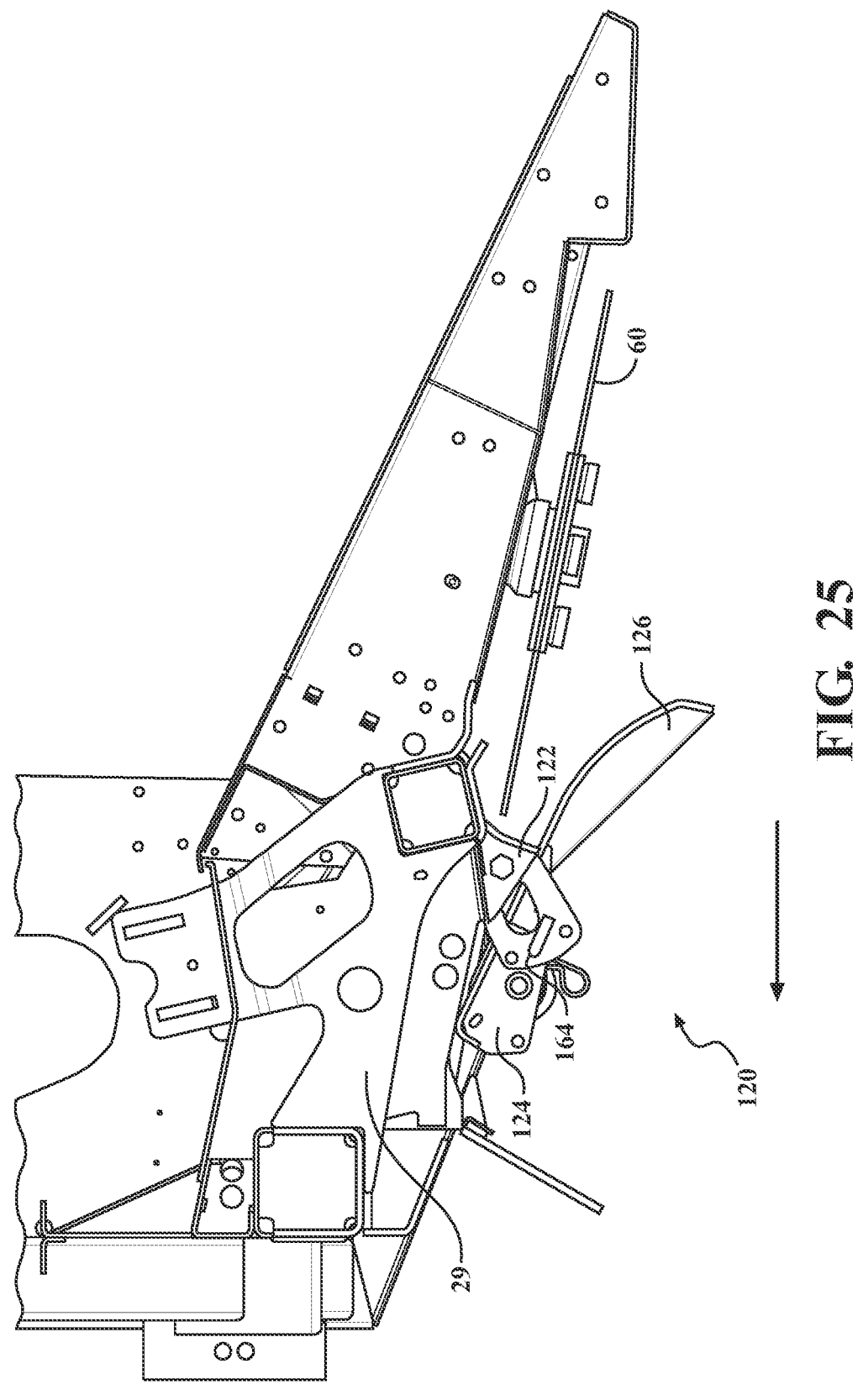
FIG. 25 is a side view of the stubble stomper shown in FIG. 11 in a middle height position and in a breakaway position attached to an agricultural machine moving in a reverse direction.
Figure 26:
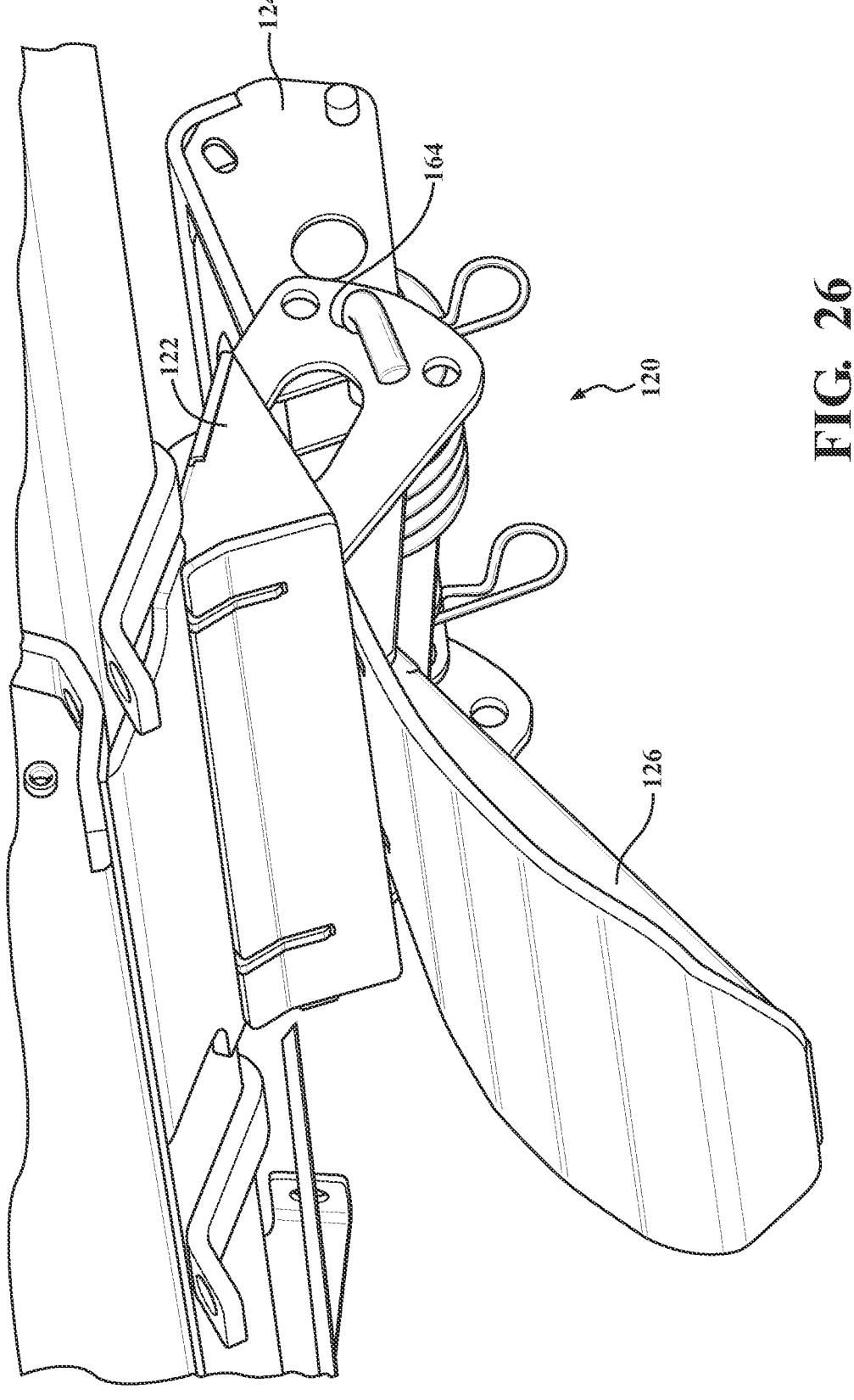
FIG. 26 is a perspective, front view of the stubble stomper shown in FIG. 25.
Figure 27:
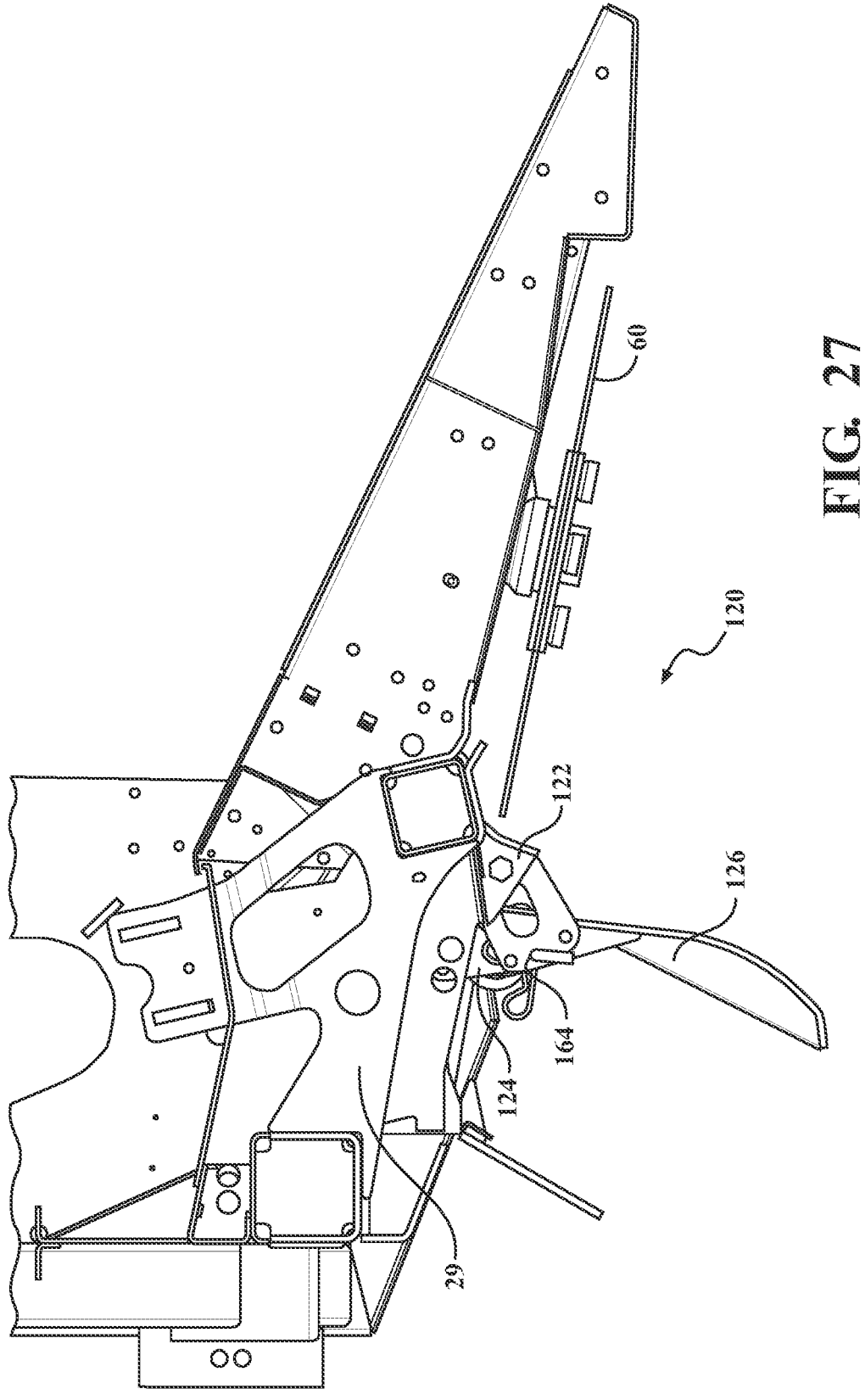
FIG. 27 is a side view of the stubble stomper shown in FIG. 11 in a middle height position attached to an agricultural machine and in a breakaway position.

When the stubble stomper 120 encounters a force greater than a predetermined force, the spring pin 152 will disengage from the slot 154 in the outer wall 132b of the hinge assembly 124 and the hinge assembly 124 along with the attached stomper shoe 126 will rotate about axis 142, defined by aligned pivot pins 136a, 136b, in the first rotational direction from its default position, into a breakaway position. This may occur, for example, when the stomper shoe 126 encounters an obstruction like a rock on the ground while the agricultural machine is in a reverse direction or if the shoe engages with the trailer when loading or unloading. The predetermined force is defined by the amount of force required to disengage the spring pin 152 from the slot 154 by compression of the spring 161 in the spring pin 152. When the spring 161 in the spring pin 152 encounters the predetermined force, the spring 161 compresses causing the spring pin 52 to move such that the chamfered end 152b of the spring pin 152 disengages from the slot 154. Once the chamfered end 152b of the spring pin 152 disengages from the slot 154, the hinge assembly 124 can pivot about rotational axis 142 defined by pivot pins 136a, 136b. Further, once the spring pin chamfered end 152b disengages from slot 154, the stubble stomper 120 transitions into the breakaway position. FIG. 20 illustrates a side view of the position of the stomper shoe 126 while the agricultural machine is traveling in reverse. FIG. 21 illustrates the front view of the position of the stubble stomper 120 while the agricultural machine is traveling in reverse. In both of these figures, the spring pin 152 is disengaged and the stubble stomper 120 and is considered to be in a breakaway position. FIG. 22 illustrates the stubble stomper 120 broken away and in a free swing.

The self-resetting feature takes place when the stubble stomper 120 resets to its default or non-breakaway position from the breakaway position. When the agricultural machine resumes travel in the forward direction, the hinge assembly 124 and stomper shoe 126 will be forced by engagement with the ground, to rotate in the second rotational direction R2 back into the default or non-breakaway position. Similarly, if the header 29 has been raised with the hinge assembly 124 and stomper shoe 126 in the breakaway position, once the header 29 is lowered and the agricultural machine begins movement in the forward direction, the hinge assembly 124 and stomper shoe 126 will be forced from the breakaway position back to the default or neutral position. Once forward motion of the agricultural machine begins, the hinge assembly will be forced to rotate about axis 142 in the second rotational direction R2, opposite from the first rotational direction R1, and once the chamfered end 152b in the spring pin 152 and slot 154 in the outer wall 132b of hinge assembly 124 are in alignment, the force of spring 161 attached to spring pin 152 automatically forces the chamfered end 152b of spring pin 152 to re-engage with the slot 154 self-resetting the hinge assembly 124 and attached stomper shoe 126 back into the default or non-breakaway position.

In the situation where the header 29 is raised from the ground with the hinge assembly 124 and the stomper shoe 126 in the breakaway position, gravity alone is not enough to reset the stomper 20 from the breakaway position back to the default position. However, when in the breakaway position and prior to engaging with the ground, gravity does cause the hinge assembly 124 to pivot vertically, due to the center of gravity directly below the pivot pins. Once the header 29 is lowered causing the stubble stomper 120 to contact the ground and when forward motion begins, the hinge assembly 124 and stomper shoe 126 will rotate about axis 142. When the chamfered end 152b of the spring pin 152 comes into alignment with slot 154 it will be automatically forced back into position within slot 154 by the spring 161 in the spring pin 152, transitioning and self-resetting the hinge assembly 124 and stomper shoe 126 from the breakaway position back to the default or non-breakaway position.

In operation, the stubble stomper 120 can be positioned at multiple heights relative to the ground. The mounting bracket 122 includes three pairs of operating position apertures, a set of low height setting apertures 162, a set of middle height setting apertures 164, and a set of upper height setting apertures 166. The pivot pins 136a, 136b will engage with one set of operating position apertures depending upon the desired height setting.

FIGS. 11-13 and 19-22 illustrate a stubble stomper 120 mounted on the crop harvesting header 29 at a low height setting, which is close to the ground. In this low height setting, the pivot pins 136a, 136b are received within the low height setting apertures 162 in the mounting bracket 122.

FIGS. 23-27 illustrate a stubble stomper 120 mounted on the crop harvesting header 29 at a middle height setting, which is higher from the ground than the low height setting. In this middle height setting, the pivot pins 136a, 136b are received within the middle height setting apertures 164. The lower the stubble stomper 120 is mounted, meaning the closer to the ground that it is positioned, the more spring force that is applied resulting in more aggressive stomping force applied to the stalk bases. Alternatively, the higher the stubble stomper 120 is mounted, meaning the higher above the ground that it is positioned, the less spring force is applied resulting in less aggressive stomping force applied to the stalk bases.

Figure 28:
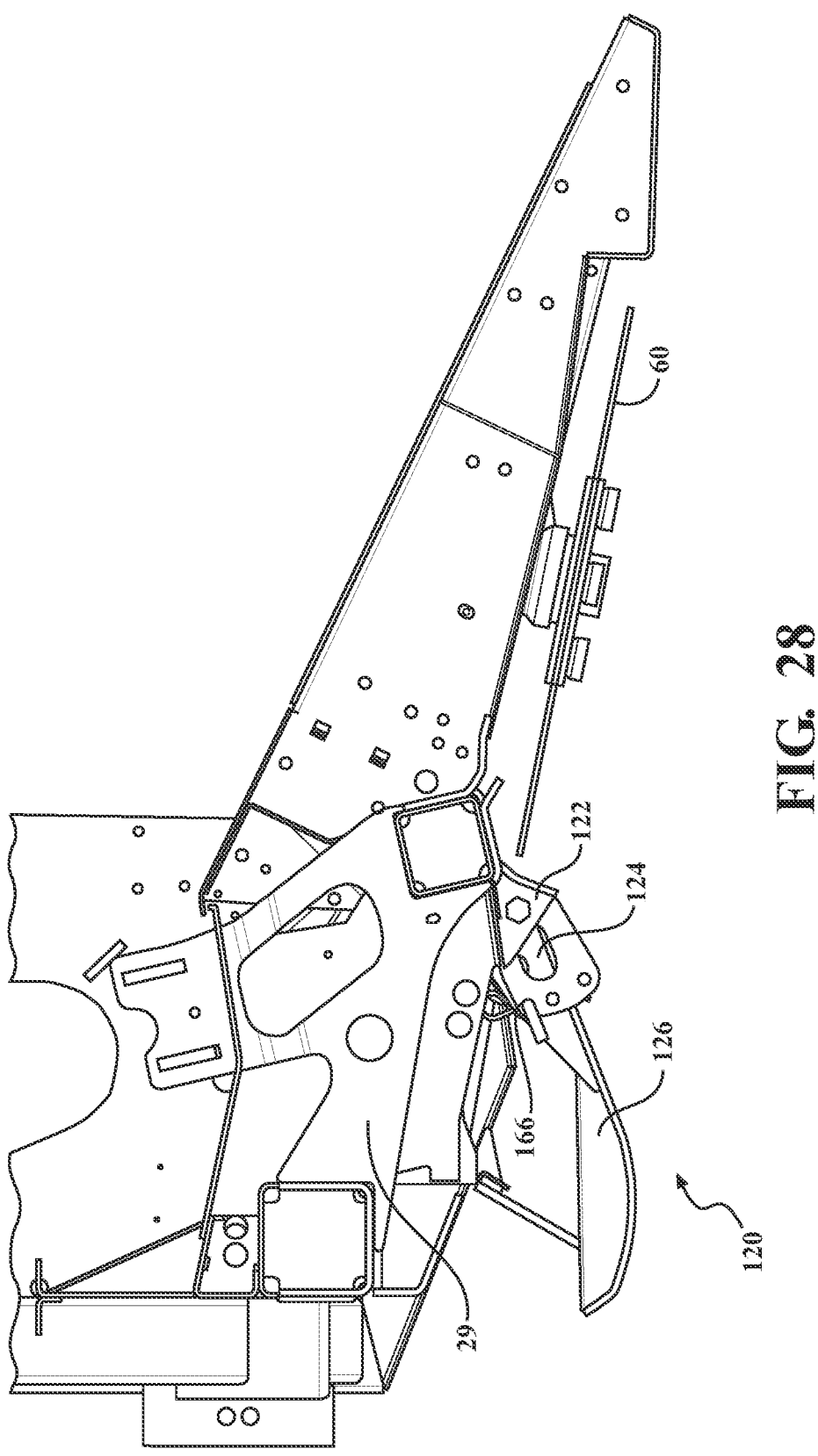
FIG. 28 is a side view of the stubble stomper shown in FIG. 11 in an upper, storage height position attached to an agricultural machine.
Figure 29:
FIG. 29 is a perspective, rear view of the stubble stomper shown in FIG. 28.

FIGS. 28-29 illustrate a stubble stomper 120 mounted on the crop harvesting header 29 at an upper height setting, which is still higher from the ground than the middle height setting and, in this embodiment, is a storage or transport position. Referring to FIG. 29, in the upper storage height setting, the pivot pins 136a, 136b are received within the upper height setting apertures 166. There are also projections 170a, 170b that extend out from the hinge assembly 124 and are received within recesses 172a, 172b in the mounting bracket 122 to secure the stubble stomper in the transport position.

Referring to FIG. 21, a stop 158 can be incorporated into the mounting bracket 122 that limits the motion of the hinge assembly 124 angle range when in the breakaway position to avoid contact with the cutterbar 60. Further, preferably the clearance between the outer parallel wall 32c of the hinge assembly 24 and the third wall 30c of the mounting bracket 22 is minimized to prevent sediment from building up to allow for free motion of the hinge assembly 24 into the breakaway position.

Both embodiments of the stubble stomper 20, 120 with self-resetting breakaway feature can be used with various row unit lengths and can also be mounted more directly beneath the crop harvesting header 29 rather than pulled behind.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

The invention claimed is:

1. A stubble stomper comprising:
   a stomper mounting bracket adapted for mounting the stubble stomper to a crop harvesting header on an agricultural machine;
   a hinge assembly rotatably attached to the stomper mounting bracket and rotatable between a default position and a breakaway position;
   a stomper shoe pivotally attached to the hinge assembly by a bushing for engaging crop stubble as the agricultural machine travels across a field;
   a torsion spring surrounding the bushing that is coupled between the hinge assembly and the stomper shoe biasing the stomper shoe in a first rotational direction relative to the hinge assembly to position the stomper shoe for engaging the crop stubble; and
   a spring pin attached to the stomper mounting bracket for selective engagement with the hinge assembly, wherein when the spring pin is engaged with the hinge assembly, the hinge assembly is in the default position preventing rotation in the first rotational direction and a second rotational direction and when the spring pin is disengaged from the hinge assembly, the hinge assembly is in the breakaway position allowing rotation in the first and second rotational directions.

2. The stubble stomper of claim 1, further comprising a clamp plate attached to the hinge assembly and engaging with the stomper shoe in the second rotational direction and preloading the torsion spring.

3. The stubble stomper of claim 1, further comprising a spring compressed between the stomper mounting bracket and the spring pin for biasing the spring pin into engagement with the hinge assembly to retain the hinge assembly in the default position.

4. The stubble stomper of claim 3, wherein:

the stomper mounting bracket includes a first parallel wall and a second parallel wall;

the hinge assembly includes an outer set of parallel walls, including a first outer parallel wall and a second outer parallel wall, and an inner set of parallel walls, including a first inner parallel wall and a second inner parallel wall;

the hinge assembly outer parallel walls are positioned within the stomper mounting bracket first parallel wall and second parallel wall;

the stomper shoe includes two protruding parallel walls; and the two protruding parallel walls on the stomper shoe are positioned within the inner set of parallel walls of the hinge assembly.

5. The stubble stomper of claim 4, wherein each of the two protruding parallel walls in the stomper shoe includes an aperture and each wall of the inner set of parallel walls of the hinge assembly includes an aperture; and the bushing is received within the apertures in the protruding parallel walls in the stomper shoe and the apertures in the inner set of parallel walls of the hinge assembly.

6. The stubble stomper of claim 5, further comprising a first pivot pin and a second pivot pin pivotally coupling the hinge assembly to the stomper mounting bracket; wherein:

the first pivot pin is received within a first pivot pin aperture in the first parallel wall of the stomper mounting bracket and a first pivot pin aperture in the first outer parallel wall of hinge assembly;

the second pivot pin is received within a second pivot pin aperture in the second parallel wall of the stomper mounting bracket and a second pivot pin aperture in the second parallel wall of the hinge assembly; and the first pivot pin and the second pivot pin are in alignment and define an axis of rotation for the hinge assembly, with respect to the stomper mounting bracket, between the default position and the breakaway position.

7. The stubble stomper of claim 6, wherein there are three sets of aligned pivot pin apertures in the first and second parallel walls of the stomper mounting bracket including a low height setting, a middle height setting, and an upper height setting.

8. The stubble stomper of claim 4, wherein said spring pin is mounted to the first parallel wall in the stomper mounting bracket at a first end; and wherein when the hinge assembly is in the default position a second end of the spring pin is positioned within a spring pin aperture in the first parallel outer wall of the hinge assembly and when the hinge assembly is in the breakaway position the second end of the spring pin is removed from the spring pin aperture in the first parallel outer wall of the hinge assembly.

9. The stubble stomper of claim 1, wherein the stomper mounting bracket further comprises a stop engaging with the stomper shoe when in the breakaway position to limit rotation of the stomper shoe in the first rotational direction.

10. A crop harvesting header comprising:

a header frame;

a cutterbar attached to the header frame; and a stubble stomper attached to the header frame, wherein the stubble stomper comprises:

a stomper mounting bracket mounted to the header frame;

a hinge assembly rotatably attached to the stomper mounting bracket and rotatable between a default position and a breakaway position;

a stomper shoe pivotally attached to the hinge assembly by a bushing for engaging crop stubble as the crop harvesting header travels across a field;

a torsion spring surrounding the bushing that is coupled between the hinge assembly and the stomper shoe biasing the stomper shoe in a first rotational direction relative to the hinge assembly to position the stomper shoe for engaging the crop stubble; and a spring pin attached to the stomper mounting bracket for selective engagement with the hinge assembly, wherein when the spring pin is engaged with the hinge assembly, the hinge assembly is in the default position preventing rotation in the first and second rotational directions and when the spring pin is disengaged from the hinge assembly, the hinge assembly is in the breakaway position allowing rotation in the first and second rotational directions.

11. The crop harvesting header of claim 10, further comprising a clamp plate attached to the hinge assembly and engaging with the stomper shoe in a second rotational direction and preloading the torsion spring.

12. The crop harvesting header of claim 10, further comprising a spring compressed between the stomper mounting bracket and the spring pin for biasing the spring pin into engagement with the hinge assembly to retain the hinge assembly in the default position.

13. The crop harvesting header of claim 10, further comprising a first pivot pin and a second pivot pin pivotally coupling the hinge assembly to the stomper mounting bracket.

14. The crop harvesting header of claim 13, further comprising three sets of aligned pivot pin apertures in the stomper mounting bracket including a low height setting, a middle height setting, and an upper height setting.

15. The crop harvesting header of claim 10, wherein the stomper mounting bracket further comprises a stop engaging with the stomper shoe when in the breakaway position to limit rotation of the stomper shoe and prevent engagement with the cutterbar.

* * * * *